(12) United States Patent
Sachs

(10) Patent No.: US 12,153,717 B2
(45) Date of Patent: Nov. 26, 2024

(54) METHOD AND SYSTEM FOR MANAGING DIGITAL EVIDENCE USING A BLOCKCHAIN

(71) Applicant: Thomson Reuters Enterprise Centre Gmb, Zug (CH)

(72) Inventor: Paul Sachs, West Sussex (GB)

(73) Assignee: Thomson Reuters Enterprise Centre Gmb, Zug (CH)

( * ) Notice: Subject to any disclaimer, the term of this patent is extended or adjusted under 35 U.S.C. 154(b) by 648 days.

(21) Appl. No.: 17/258,895

(22) PCT Filed: Jun. 28, 2019

(86) PCT No.: PCT/GB2019/051851
§ 371 (c)(1),
(2) Date: Jan. 8, 2021

(87) PCT Pub. No.: WO2020/012156
PCT Pub. Date: Jan. 16, 2020

(65) Prior Publication Data
US 2021/0294920 A1    Sep. 23, 2021

(30) Foreign Application Priority Data

Jul. 10, 2018    (GB) ...................................... 1811263

(51) Int. Cl.
*G06F 21/64*       (2013.01)
*G06F 21/10*       (2013.01)
(Continued)

(52) U.S. Cl.
CPC .............. *G06F 21/64* (2013.01); *G06F 21/10* (2013.01); *H04L 9/3239* (2013.01); *G06F 21/60* (2013.01); *H04L 9/3297* (2013.01); *H04L 9/50* (2022.05)

(58) Field of Classification Search
None
See application file for complete search history.

(56) References Cited

U.S. PATENT DOCUMENTS 6,601,172 B1 *   7/2003   Epstein ................. H04L 9/3247
                                                                  713/180
6,640,279 B2 *  10/2003   Levy ........................ G06F 21/64
                                                                   711/6
(Continued)

FOREIGN PATENT DOCUMENTS

JP         2005176008 A  *  6/2005    ......... H04N 1/00206
WO         2017106792 A1     6/2017
(Continued)

OTHER PUBLICATIONS

Adobe (Adobe Acrobat 8 Standard, User Guide, 2007, pp. 1-75 (Year: 2007).*

(Continued)

*Primary Examiner* — James R Turchen
*Assistant Examiner* — James J Wilcox
(74) *Attorney, Agent, or Firm* — SoCal IP Law Group LLP; Mark Andrew Goldstein

(57) ABSTRACT

A computer-implemented method and system for managing digital evidence using a blockchain (12). The method comprises receiving an evidence data file (5), the evidence data file (5) being identified by: an evidence identifier, and a hash code computed from the evidence data file (5); generating a block (11) for the blockchain (12) by combining data indicative of: a hash of a previous block (13) in the blockchain (12), the evidence identifier, and the hash code computed from the evidence data file (5); and storing the generated block (11) as a new block in the blockchain (12), wherein the method further comprises: outputting at least part of the data in the blockchain (12) in response to a user (Continued)

request to enable a user to verify the authenticity of the evidence data file (5) using the data in the blockchain (12).

12 Claims, 3 Drawing Sheets

(51) Int. Cl.
　　　*H04L 9/32*　　　(2006.01)
　　　*G06F 21/60*　　　(2013.01)
　　　*H04L 9/00*　　　(2022.01)

(56) References Cited

U.S. PATENT DOCUMENTS

| | | | | |
|---|---|---|---|---|
| 6,801,935 | B2* | 10/2004 | Shen | G06F 21/608 |
| | | | | 358/1.14 |
| 6,948,066 | B2* | 9/2005 | Hind | H04L 9/3231 |
| | | | | 713/168 |
| 7,047,404 | B1* | 5/2006 | Doonan | H04L 9/3297 |
| | | | | 713/156 |
| 7,278,168 | B1* | 10/2007 | Chaudhury | G06Q 50/184 |
| | | | | 713/176 |
| 7,761,922 | B1* | 7/2010 | Baum | G06F 21/10 |
| | | | | 726/26 |
| 7,814,314 | B2* | 10/2010 | Gentry | H04L 63/0823 |
| | | | | 713/175 |
| 7,925,012 | B2* | 4/2011 | Lecomte | G06F 21/10 |
| | | | | 713/153 |
| 8,214,295 | B2* | 7/2012 | O'Donnell | G06F 21/10 |
| | | | | 705/54 |
| 8,488,136 | B2* | 7/2013 | Nakayama | H04N 1/0087 |
| | | | | 358/1.15 |
| 8,695,096 | B1* | 4/2014 | Zhang | G06F 21/564 |
| | | | | 707/811 |
| 8,713,692 | B2* | 4/2014 | Lamb | G06F 21/645 |
| | | | | 707/706 |
| 8,781,154 | B1* | 7/2014 | Ioffe | G10L 25/54 |
| | | | | 283/68 |
| 8,826,036 | B1* | 9/2014 | Snodgrass | G06F 21/1011 |
| | | | | 713/168 |
| 8,965,809 | B1* | 2/2015 | Begen | G07B 17/04 |
| | | | | 177/25.15 |
| 9,063,978 | B1* | 6/2015 | Kapoor | G06Q 10/00 |
| 9,082,279 | B2* | 7/2015 | Le Cam | H04L 9/3263 |
| 9,098,725 | B2* | 8/2015 | Papamanthou | G06F 21/64 |
| 9,129,088 | B1* | 9/2015 | Baschy | G06F 21/10 |
| 9,300,678 | B1* | 3/2016 | Stack | G06F 21/6218 |
| 9,356,927 | B2* | 5/2016 | Aggarwal | H04L 63/0823 |
| 9,436,717 | B2* | 9/2016 | Tyagi | G06F 21/60 |
| 9,443,108 | B1* | 9/2016 | Roth | G06F 21/70 |
| 9,608,829 | B2* | 3/2017 | Spanos | H04L 9/3268 |
| 9,635,000 | B1* | 4/2017 | Muftic | H04L 9/3239 |
| 9,679,276 | B1* | 6/2017 | Cuende | G06Q 20/3827 |
| 9,747,586 | B1* | 8/2017 | Frolov | G06Q 20/363 |
| 9,754,131 | B2* | 9/2017 | Wilson | G06F 21/64 |
| 9,760,697 | B1* | 9/2017 | Walker | G06F 21/6245 |
| 9,785,369 | B1* | 10/2017 | Ateniese | G06F 3/0659 |
| 9,811,675 | B2* | 11/2017 | Lu | G06F 21/60 |
| 9,830,593 | B2* | 11/2017 | Myers | G06Q 20/3678 |
| 9,858,424 | B1* | 1/2018 | Grafi | H04L 63/1425 |
| 9,870,508 | B1* | 1/2018 | Hodgson | H04N 21/2347 |
| 9,893,898 | B2* | 2/2018 | Kreft | H04L 9/0643 |
| 9,965,628 | B2* | 5/2018 | Ford | H04L 9/3236 |
| 9,967,333 | B2* | 5/2018 | Chen | H04L 63/10 |
| 9,967,334 | B2* | 5/2018 | Ford | H04L 41/0806 |
| 9,973,341 | B2* | 5/2018 | Ferrin | H04L 9/3236 |
| 9,990,504 | B1* | 6/2018 | Chapman | H04W 4/023 |
| 9,992,022 | B2* | 6/2018 | Chapman | H04L 9/3236 |
| 9,992,028 | B2* | 6/2018 | Androulaki | H04L 9/14 |
| 9,992,262 | B2* | 6/2018 | Pathak | G06F 3/04842 |
| 9,998,286 | B1* | 6/2018 | Ramathal | G06F 21/33 |
| 10,013,246 | B2* | 7/2018 | Zessin | H04L 67/12 |
| 10,015,017 | B2* | 7/2018 | Finlow-Bates | G06F 21/33 |
| 10,025,941 | B1* | 7/2018 | Griffin | G06F 21/6209 |
| 10,043,022 | B2* | 8/2018 | Reedy | G06F 21/6218 |
| 10,061,932 | B1* | 8/2018 | Combs | H04N 1/4486 |
| 10,102,265 | B1* | 10/2018 | Madisetti | G06F 16/27 |
| 10,102,526 | B1* | 10/2018 | Madisetti | G06Q 20/389 |
| 10,108,811 | B1* | 10/2018 | Walker | G06F 21/31 |
| 10,116,693 | B1* | 10/2018 | Robinson | H04L 67/01 |
| 10,135,834 | B1* | 11/2018 | Galebach | G06Q 10/10 |
| 10,146,792 | B1* | 12/2018 | Dobrek | H04L 9/32 |
| 10,164,952 | B2* | 12/2018 | Vandervort | H04L 9/3247 |
| 10,198,418 | B2* | 2/2019 | McCabe | G06Q 10/10 |
| 10,200,198 | B2* | 2/2019 | Ganesan | G06F 16/2255 |
| 10,243,748 | B1* | 3/2019 | Callan | H04L 9/3239 |
| 10,256,974 | B1* | 4/2019 | Rodriguez De Castro | |
| | | | | H04L 9/0863 |
| 10,263,773 | B2* | 4/2019 | Chien | H04L 9/3221 |
| 10,277,398 | B2* | 4/2019 | Weimer | H04L 9/3236 |
| 10,304,062 | B1* | 5/2019 | Hines | G06Q 30/018 |
| 10,325,156 | B1* | 6/2019 | Bertsch | G06F 21/64 |
| 10,339,299 | B1* | 7/2019 | Magnuson | G06F 21/52 |
| 10,362,517 | B2* | 7/2019 | Crawford | H04L 69/40 |
| 10,366,204 | B2* | 7/2019 | Tanner, Jr. | G06Q 40/08 |
| 10,380,842 | B2* | 8/2019 | Jayachandran | H04L 9/3236 |
| 10,382,485 | B2* | 8/2019 | Won | H04W 4/70 |
| 10,404,471 | B1* | 9/2019 | Griffin | H04L 9/50 |
| 10,404,706 | B2* | 9/2019 | Lonstein | G06Q 50/184 |
| 10,411,897 | B2* | 9/2019 | Paolini-Subramanya | |
| | | | | H04L 63/123 |
| 10,452,699 | B1* | 10/2019 | Keskar | G06V 30/40 |
| 10,484,168 | B2* | 11/2019 | Ford | H04L 67/104 |
| 10,484,341 | B1* | 11/2019 | Todd | G06F 9/45558 |
| 10,484,346 | B2* | 11/2019 | Russinovich | H04L 9/3265 |
| 10,489,757 | B2* | 11/2019 | Melika | H04L 9/40 |
| 10,491,578 | B1* | 11/2019 | Hebert | H04L 9/001 |
| 10,499,250 | B2* | 12/2019 | Turner | H04W 16/02 |
| 10,523,421 | B2* | 12/2019 | Hunt | H04L 9/3236 |
| 10,523,443 | B1* | 12/2019 | Kleinman | H04L 9/30 |
| 10,528,753 | B2* | 1/2020 | Nunes | H04L 9/3263 |
| 10,534,913 | B2* | 1/2020 | Daniel | G06F 21/645 |
| 10,554,412 | B2* | 2/2020 | Subramanian | H04L 63/12 |
| 10,558,955 | B2* | 2/2020 | Haldenby | G06F 21/62 |
| 10,567,156 | B2* | 2/2020 | Castinado | H04L 67/108 |
| 10,567,369 | B2* | 2/2020 | Scott | H04L 63/20 |
| 10,581,613 | B2* | 3/2020 | Ford | H04L 9/3247 |
| 10,637,646 | B2* | 4/2020 | Krishnamacharya | |
| | | | | H04L 9/0637 |
| 10,666,424 | B1* | 5/2020 | Rutley | H04L 63/1416 |
| 10,666,767 | B1* | 5/2020 | Floyd | G05D 1/0214 |
| 10,685,009 | B1* | 6/2020 | Rutley | H04L 9/32 |
| 10,685,171 | B2* | 6/2020 | Lancioni | G06F 21/602 |
| 10,693,716 | B2* | 6/2020 | Patil | H04W 12/08 |
| 10,713,654 | B2* | 7/2020 | Dillenberger | G06Q 20/3829 |
| 10,715,323 | B2* | 7/2020 | Chan | H04L 9/0894 |
| 10,735,183 | B1* | 8/2020 | Mehta | H04L 9/50 |
| 10,735,193 | B1* | 8/2020 | Knas | H04L 9/3239 |
| 10,740,733 | B2* | 8/2020 | Moir | G06Q 20/3827 |
| 10,756,904 | B1* | 8/2020 | Perlman | G06F 21/64 |
| 10,762,479 | B2* | 9/2020 | Hyun | G06Q 20/0658 |
| 10,764,031 | B2* | 9/2020 | Arquero | H04L 63/14 |
| 10,796,000 | B2* | 10/2020 | Smith | G06F 21/64 |
| 10,796,022 | B2* | 10/2020 | Dassenno | H04L 9/3242 |
| 10,796,393 | B2* | 10/2020 | Messerges | G06Q 50/265 |
| 10,803,540 | B2* | 10/2020 | Schuler | G06Q 50/265 |
| 10,805,067 | B2* | 10/2020 | Griffin | H04L 9/0637 |
| 10,805,068 | B1* | 10/2020 | Leise | G06Q 40/08 |
| 10,810,290 | B2* | 10/2020 | Minter | G06F 21/64 |
| 10,824,759 | B1* | 11/2020 | Magerkurth | G06Q 20/3825 |
| 10,826,681 | B1* | 11/2020 | Dayan | G06F 9/4401 |
| 10,839,015 | B1* | 11/2020 | Leise | G06F 16/9027 |
| 10,841,097 | B2* | 11/2020 | Davis | G06Q 20/02 |
| 10,841,291 | B2* | 11/2020 | McClure | H04L 9/3234 |
| 10,848,315 | B2* | 11/2020 | Watanabe | G06F 21/64 |
| 10,867,057 | B1* | 12/2020 | Knas | G06F 21/32 |
| 10,867,058 | B2* | 12/2020 | Duffy | H04L 63/0823 |
| 10,872,381 | B1* | 12/2020 | Leise | H04W 12/009 |
| 10,873,462 | B1* | 12/2020 | Frinken | H04L 9/3236 |
| 10,887,107 | B1* | 1/2021 | Chan | H04L 9/3271 |
| 10,887,309 | B2* | 1/2021 | Huh | H04L 63/10 |
| 10,891,694 | B1* | 1/2021 | Leise | G08G 1/0112 |
| 10,896,418 | B2* | 1/2021 | Gonzales, Jr. | G06F 21/6218 |

(56) References Cited

U.S. PATENT DOCUMENTS

| | | | |
|---|---|---|---|
| 10,938,557 B2* | 3/2021 | Fan | H04L 9/0869 |
| 10,943,294 B1* | 3/2021 | Tarmann | H04L 9/3239 |
| 10,949,926 B1* | 3/2021 | Call | G06Q 40/08 |
| 10,963,400 B2* | 3/2021 | Deshpande | G06Q 10/10 |
| 10,965,448 B1* | 3/2021 | Raman | H04L 67/108 |
| 10,972,279 B2* | 4/2021 | Sethi | H04L 9/3236 |
| 10,979,476 B2* | 4/2021 | Allen | H04L 12/1836 |
| 11,004,072 B2* | 5/2021 | Georgiadis | H04L 63/08 |
| 11,017,112 B2* | 5/2021 | Winarski | G06F 21/64 |
| 11,023,248 B2* | 6/2021 | Daniel | G06F 8/36 |
| 11,050,781 B2* | 6/2021 | Samuel | H04M 15/47 |
| 11,055,703 B2* | 7/2021 | Kondo | H04L 63/123 |
| 11,063,744 B2* | 7/2021 | Schmidt-Karaca | H04L 9/0618 |
| 11,063,745 B1* | 7/2021 | Du | H04L 9/0825 |
| 11,081,017 B2* | 8/2021 | Isozu | H04L 63/04 |
| 11,094,007 B1* | 8/2021 | Tarmann | G06Q 40/03 |
| 11,108,627 B2* | 8/2021 | Smith | H04L 67/12 |
| 11,132,707 B2* | 9/2021 | Johnson | H04L 9/3236 |
| 11,139,957 B2* | 10/2021 | Ahlbäck | H04L 9/0643 |
| 11,144,911 B2* | 10/2021 | Smith | G06Q 20/367 |
| 11,153,091 B2* | 10/2021 | Daniel | H04L 9/50 |
| 11,157,876 B1* | 10/2021 | Knas | H04L 63/123 |
| 11,164,107 B1* | 11/2021 | Craib | G06N 20/00 |
| 11,164,164 B2* | 11/2021 | Minor | G06Q 20/3678 |
| 11,165,754 B2* | 11/2021 | Pattanaik | H04L 63/12 |
| 11,165,756 B2* | 11/2021 | Mandal | H04L 63/108 |
| 11,165,862 B2* | 11/2021 | Austin | H04L 63/10 |
| 11,176,550 B2* | 11/2021 | Vintila | H04L 9/0825 |
| 11,188,883 B2* | 11/2021 | Christidis | G06Q 20/3829 |
| 11,188,920 B2* | 11/2021 | Irazabal | G06Q 20/42 |
| 11,204,879 B2* | 12/2021 | Yamazaki | G06F 21/105 |
| 11,205,137 B2* | 12/2021 | Benke | H04L 9/50 |
| 11,210,426 B2* | 12/2021 | Yan | G06F 16/2474 |
| 11,227,457 B2* | 1/2022 | Patel | H04L 9/3239 |
| 11,232,415 B2* | 1/2022 | Melika | H04L 9/3236 |
| 11,239,999 B1* | 2/2022 | Winarski | H04L 9/12 |
| 11,240,035 B2* | 2/2022 | Stollman | H04L 9/3239 |
| 11,244,059 B2* | 2/2022 | Yoon | G06F 21/602 |
| 11,244,292 B2* | 2/2022 | Wright | G06Q 20/382 |
| 11,270,303 B2* | 3/2022 | Mandal | G06Q 30/0207 |
| 11,296,864 B2* | 4/2022 | Deshpande | H04L 9/3247 |
| 11,296,873 B2* | 4/2022 | Destefanis | H04L 9/0861 |
| 11,307,835 B2* | 4/2022 | Wright | H04L 9/3297 |
| 11,308,448 B1* | 4/2022 | Knas | G06Q 10/105 |
| 11,328,347 B2* | 5/2022 | Lim | H04L 9/3247 |
| 11,334,888 B2* | 5/2022 | Li | G06Q 20/3823 |
| 11,341,484 B2* | 5/2022 | Wright | H04L 9/3252 |
| 11,341,490 B2* | 5/2022 | Jawaharlal | G06Q 10/0639 |
| 11,347,838 B2* | 5/2022 | Wright | G06F 21/64 |
| 11,348,095 B2* | 5/2022 | Fletcher | H04L 9/3255 |
| 11,397,708 B2* | 7/2022 | Roennow | H04L 9/0637 |
| 11,410,145 B2* | 8/2022 | Wright | G06Q 20/3829 |
| 11,411,740 B2* | 8/2022 | Chan | G06Q 20/065 |
| 11,416,226 B2* | 8/2022 | Wright | G06F 8/51 |
| 11,416,942 B1* | 8/2022 | Leise | G07C 5/0816 |
| 11,423,351 B2* | 8/2022 | Ren | G06F 21/64 |
| 11,424,913 B2* | 8/2022 | Watanabe | G06F 21/105 |
| 11,429,967 B2* | 8/2022 | Fedorov | H04L 9/3247 |
| 11,436,620 B2* | 9/2022 | Stanciu | G06Q 20/065 |
| 11,451,398 B2* | 9/2022 | Ghanea-Hercock | H04L 9/3239 |
| 11,461,245 B2* | 10/2022 | Medvedeva | H04L 9/50 |
| 11,461,502 B2* | 10/2022 | Irvine | G06F 21/64 |
| 11,481,511 B2* | 10/2022 | Amar | H04L 9/3247 |
| 11,481,740 B1* | 10/2022 | Todd | G06Q 20/223 |
| 11,501,365 B1* | 11/2022 | Awasthy | H04L 9/50 |
| 11,505,924 B2* | 11/2022 | Periaswamy | H04L 9/30 |
| 11,538,001 B2* | 12/2022 | Handoko | G06Q 20/065 |
| 11,586,751 B2* | 2/2023 | Daniel | H04L 9/50 |
| 11,587,070 B2* | 2/2023 | Maim | H04L 63/12 |
| 11,606,211 B2* | 3/2023 | Liem | H04L 9/0643 |
| 11,606,219 B2* | 3/2023 | Wright | H04L 9/3239 |
| 11,611,445 B2* | 3/2023 | Baykaner | G06Q 20/00 |
| 11,625,694 B2* | 4/2023 | Wright | H04L 9/3247 705/71 |
| 11,625,731 B2* | 4/2023 | Negi | H04L 9/3239 705/51 |
| 11,651,358 B2* | 5/2023 | Davis | H04L 9/3247 705/76 |
| 11,658,825 B2* | 5/2023 | Falk | H04L 9/3236 713/164 |
| 11,669,832 B2* | 6/2023 | Vincent | G06Q 20/145 705/64 |
| 11,673,722 B2* | 6/2023 | Verma | H04L 9/3239 705/332 |
| 11,727,501 B2* | 8/2023 | Wright | H04L 9/0838 705/50 |
| 11,769,156 B2* | 9/2023 | Saket | H04L 63/10 705/44 |
| 11,797,995 B2* | 10/2023 | Arora | G06Q 20/389 |
| 11,868,995 B2* | 1/2024 | Lindemann | H04L 9/0877 |
| 11,940,958 B2* | 3/2024 | Franceschini | H04L 9/3239 |
| 12,013,813 B2* | 6/2024 | Winarski | H04L 67/108 |
| 2002/0016921 A1* | 2/2002 | Olsen | G06F 21/608 709/229 |
| 2002/0038296 A1* | 3/2002 | Margolus | G06F 21/60 |
| 2002/0049749 A1* | 4/2002 | Helgeson | H04L 67/02 707/999.003 |
| 2002/0078343 A1* | 6/2002 | Rubin | G06F 21/10 713/153 |
| 2002/0131593 A1* | 9/2002 | Parry | G06F 3/1261 713/193 |
| 2002/0184494 A1* | 12/2002 | Awadalla | G06F 21/606 713/160 |
| 2003/0009681 A1* | 1/2003 | Harada | G11B 20/00224 713/168 |
| 2003/0081788 A1* | 5/2003 | Simpson | G06F 21/608 380/278 |
| 2003/0095709 A1* | 5/2003 | Zhou | G06T 7/12 382/190 |
| 2003/0145209 A1* | 7/2003 | Eagle | G06F 21/64 713/179 |
| 2004/0059929 A1* | 3/2004 | Rodgers | G06F 21/10 713/193 |
| 2004/0078337 A1* | 4/2004 | King | G06F 21/64 705/51 |
| 2004/0133782 A1* | 7/2004 | Sander | G07C 9/22 713/170 |
| 2004/0205346 A1* | 10/2004 | Muller | G06F 21/64 713/176 |
| 2004/0216010 A1* | 10/2004 | Muller | G06F 21/64 714/38.1 |
| 2005/0062998 A1* | 3/2005 | Kumashio | H04L 63/0428 358/1.14 |
| 2005/0091492 A1* | 4/2005 | Benson | G06Q 20/04 713/170 |
| 2005/0120290 A1* | 6/2005 | Mistry | G06F 21/6209 715/272 |
| 2005/0125722 A1* | 6/2005 | Mistry | G06F 21/64 715/251 |
| 2005/0132079 A1* | 6/2005 | Iglesia | H04L 63/1408 709/230 |
| 2005/0134894 A1* | 6/2005 | Littman | G06F 21/10 358/1.14 |
| 2005/0204130 A1* | 9/2005 | Harris | G06F 21/31 713/165 |
| 2005/0223164 A1* | 10/2005 | Kitamura | G06F 21/31 711/112 |
| 2005/0234908 A1* | 10/2005 | Lowrance | G06F 16/2255 |
| 2005/0280855 A1* | 12/2005 | Ono | H04N 1/32128 358/1.13 |
| 2005/0288939 A1* | 12/2005 | Peled | G06Q 10/10 705/325 |
| 2006/0010301 A1* | 1/2006 | Yagawa | G06F 21/64 711/163 |
| 2006/0075241 A1* | 4/2006 | Deguillaume | H04N 1/32256 713/176 |
| 2006/0075245 A1* | 4/2006 | Meier | H04L 9/321 713/176 |
| 2006/0075247 A1* | 4/2006 | Stevens | H04L 9/3247 713/178 |

(56) References Cited

U.S. PATENT DOCUMENTS

| | | | | |
|---|---|---|---|---|
| 2006/0095795 A1* | 5/2006 | Nakamura | ............ | H04L 9/3236 713/181 |
| 2006/0117182 A1* | 6/2006 | Wolff | .................. | H04L 9/3247 713/176 |
| 2006/0129803 A1* | 6/2006 | Gentry | ................. | H04L 9/3236 713/156 |
| 2006/0253714 A1* | 11/2006 | Ito | ........................ | G06F 21/64 713/181 |
| 2007/0061889 A1* | 3/2007 | Sainaney | ............. | H04L 63/083 713/165 |
| 2007/0094740 A1* | 4/2007 | Shudo | .................. | G06F 21/602 707/999.009 |
| 2007/0106912 A1* | 5/2007 | Tanaka | ................. | H04L 9/3297 713/180 |
| 2007/0195953 A1* | 8/2007 | Lecomte | ................ | G06F 21/10 380/42 |
| 2007/0208800 A1* | 9/2007 | Frohlich | ................ | G06Q 10/10 726/3 |
| 2008/0028220 A1* | 1/2008 | Wyssen | .............. | H04N 1/00129 713/176 |
| 2008/0112013 A1* | 5/2008 | Ferlitsch | .............. | G06F 3/1238 358/3.28 |
| 2008/0168554 A1* | 7/2008 | Kim | ..................... | H04L 63/0428 380/243 |
| 2008/0177550 A1* | 7/2008 | Mumm | .................. | G06F 21/32 704/273 |
| 2008/0177799 A1* | 7/2008 | Wilson | ............... | H04N 1/32133 |
| 2008/0229099 A1* | 9/2008 | Kim | ........................ | G06F 21/64 713/168 |
| 2008/0243898 A1* | 10/2008 | Gormish | ................ | G06F 21/64 707/999.102 |
| 2008/0307228 A1* | 12/2008 | Faria | ..................... | H04L 9/0866 707/E17.014 |
| 2009/0064277 A1* | 3/2009 | Isoda | .................... | G06F 21/608 713/193 |
| 2009/0244595 A1* | 10/2009 | Kim | ....................... | H04N 1/444 358/1.15 |
| 2009/0244596 A1* | 10/2009 | Katano | ................ | G06F 3/1238 358/1.15 |
| 2009/0287931 A1* | 11/2009 | Kinsella | .................. | G06F 21/64 709/206 |
| 2009/0328218 A1* | 12/2009 | Tsurukawa | .............. | G06F 21/86 711/216 |
| 2010/0031140 A1* | 2/2010 | Cummins | ............. | H04L 9/3247 715/236 |
| 2010/0070769 A1* | 3/2010 | Shima | .................. | H04L 9/3271 380/46 |
| 2010/0115284 A1* | 5/2010 | Hahn | ...................... | G06F 21/64 713/179 |
| 2010/0180027 A1* | 7/2010 | Drako | .................. | G06F 21/60 709/225 |
| 2010/0202006 A1* | 8/2010 | Nuggehalli | ........... | G06F 21/608 358/1.14 |
| 2010/0281538 A1* | 11/2010 | Yu | ........................ | G06Q 10/107 726/22 |
| 2011/0022496 A1* | 1/2011 | Johnson | ............. | G06Q 30/0613 705/26.41 |
| 2011/0055590 A1* | 3/2011 | Lee | ........................ | G06F 21/31 707/E17.115 |
| 2011/0093713 A1* | 4/2011 | Blot-Lefevre | .......... | H04L 9/321 713/176 |
| 2011/0125648 A1* | 5/2011 | Price | ...................... | G06F 21/64 705/50 |
| 2011/0131661 A1* | 6/2011 | Valls Fontanals | .... | G06F 21/645 726/26 |
| 2011/0203004 A1* | 8/2011 | Ziering | .............. | G06Q 30/0603 726/28 |
| 2011/0314371 A1* | 12/2011 | Peterson | ............... | G06F 40/186 715/234 |
| 2012/0054832 A1* | 3/2012 | Ghosh | .................. | H04L 9/0866 726/4 |
| 2012/0197901 A1* | 8/2012 | Wilson | .................. | G06F 16/152 707/E17.014 |
| 2012/0260156 A1* | 10/2012 | Tsao | ........................ | H04L 63/20 715/234 |
| 2013/0027738 A1* | 1/2013 | Dowling | ............ | H04N 1/00217 358/1.14 |
| 2013/0047221 A1* | 2/2013 | Warnock | ................ | G06Q 30/06 726/4 |
| 2013/0054607 A1* | 2/2013 | Gladney | ................ | G06F 16/94 707/741 |
| 2013/0159720 A1* | 6/2013 | Gonser | ................ | G06F 21/645 713/176 |
| 2013/0173482 A1* | 7/2013 | Twining | ................ | H04L 9/3247 705/310 |
| 2013/0179961 A1* | 7/2013 | Abe | ........................ | G06F 21/44 726/9 |
| 2013/0198854 A1* | 8/2013 | Erway | .................... | H04L 9/008 726/27 |
| 2013/0263279 A1* | 10/2013 | Kobashi | ................ | G06F 3/1222 726/26 |
| 2014/0029031 A1* | 1/2014 | Landwehr | ............. | G06F 3/1298 358/1.14 |
| 2014/0032899 A1* | 1/2014 | Kaufman | ............. | G06F 21/6209 713/165 |
| 2014/0032913 A1* | 1/2014 | Tenenboym | .......... | H04L 9/3247 715/764 |
| 2014/0033016 A1* | 1/2014 | Perelman | ............. | G06F 40/186 715/234 |
| 2014/0033265 A1* | 1/2014 | Leeds | ...................... | G06F 21/10 726/1 |
| 2014/0041052 A1* | 2/2014 | Follis | ...................... | G06F 21/10 726/28 |
| 2014/0082749 A1* | 3/2014 | Holland | ................ | G06F 21/60 726/29 |
| 2014/0122491 A1* | 5/2014 | Pennefather | .......... | G06F 16/285 707/737 |
| 2014/0181528 A1* | 6/2014 | Ram | ....................... | G06F 21/64 713/176 |
| 2014/0237597 A1* | 8/2014 | Zhang | .................. | G06F 21/564 726/23 |
| 2014/0337631 A1* | 11/2014 | Greive | ................. | A47J 36/321 713/176 |
| 2014/0346222 A1* | 11/2014 | Mastykarz | ............ | G06T 1/0007 715/224 |
| 2015/0066568 A1* | 3/2015 | Rees | ................. | G06Q 10/06315 705/7.25 |
| 2015/0095376 A1* | 4/2015 | Pathak | .................... | G06F 21/10 707/784 |
| 2015/0205940 A1* | 7/2015 | Xiong | .................. | G06F 21/602 713/167 |
| 2015/0242371 A1* | 8/2015 | Yu | .......................... | G06F 40/166 715/274 |
| 2015/0278820 A1* | 10/2015 | Meadows | ............... | G10L 25/48 705/64 |
| 2015/0304289 A1* | 10/2015 | Cho | ....................... | H04L 63/126 713/153 |
| 2015/0326538 A1* | 11/2015 | Keane | ................. | H04L 63/0428 713/168 |
| 2015/0332283 A1* | 11/2015 | Witchey | ................ | G06F 21/00 705/3 |
| 2015/0349957 A1* | 12/2015 | Thibadeau, Sr. | ... | H04L 63/0861 713/155 |
| 2016/0028552 A1* | 1/2016 | Spanos | ................ | H04L 9/3242 713/178 |
| 2016/0042159 A1* | 2/2016 | Vijay | ...................... | G06F 21/10 726/29 |
| 2016/0078241 A1* | 3/2016 | Lu | ........................... | G06F 21/10 726/30 |
| 2016/0110320 A1* | 4/2016 | Balinsky | .............. | G06F 40/131 358/1.15 |
| 2016/0117492 A1* | 4/2016 | Chabanne | ............... | G06F 21/32 726/19 |
| 2016/0162703 A1* | 6/2016 | Kaufmann | ............ | G06F 21/64 726/28 |
| 2016/0212146 A1* | 7/2016 | Wilson | .................. | H04L 9/3226 |

(56) References Cited

U.S. PATENT DOCUMENTS

| | | | |
|---|---|---|---|
| 2016/0253622 A1* | 9/2016 | Sriram | H04L 9/3247 |
| | | | 713/179 |
| 2016/0283920 A1* | 9/2016 | Fisher | G06Q 20/065 |
| 2016/0291953 A1* | 10/2016 | Tuzlukov | G06F 8/61 |
| 2016/0292396 A1* | 10/2016 | Akerwall | G06F 21/10 |
| 2016/0292456 A1* | 10/2016 | Dubey | G06F 16/21 |
| 2016/0300223 A1* | 10/2016 | Grey | G06Q 20/3825 |
| 2016/0344737 A1* | 11/2016 | Anton | H04L 9/0891 |
| 2016/0365978 A1* | 12/2016 | Ganesan | G06F 16/2255 |
| 2016/0379330 A1* | 12/2016 | Powers | G06F 21/00 |
| | | | 382/100 |
| 2017/0005804 A1* | 1/2017 | Zinder | H04L 63/123 |
| 2017/0024832 A1* | 1/2017 | Dareshani | G06Q 20/065 |
| 2017/0041296 A1* | 2/2017 | Ford | G06F 21/64 |
| 2017/0046693 A1* | 2/2017 | Haldenby | H04L 9/3247 |
| 2017/0078101 A1* | 3/2017 | Maximov | H04L 9/006 |
| 2017/0103066 A1* | 4/2017 | Kisin | G06F 40/197 |
| 2017/0116693 A1* | 4/2017 | Rae | G06Q 50/184 |
| 2017/0124556 A1* | 5/2017 | Seger, II | H04L 67/1095 |
| 2017/0142050 A1* | 5/2017 | Yu | G06F 21/606 |
| 2017/0148016 A1* | 5/2017 | Davis | G06Q 20/389 |
| 2017/0180134 A1* | 6/2017 | King | H04L 63/0876 |
| 2017/0193464 A1* | 7/2017 | Sher | G06Q 20/065 |
| 2017/0206523 A1* | 7/2017 | Goeringer | G06Q 20/3827 |
| 2017/0220815 A1* | 8/2017 | Ansari | G06Q 20/36 |
| 2017/0230181 A1* | 8/2017 | Pogorelik | H04N 1/32272 |
| 2017/0236123 A1* | 8/2017 | Ali | G06Q 20/3825 |
| | | | 705/75 |
| 2017/0237554 A1* | 8/2017 | Jacobs | H04W 12/106 |
| | | | 713/171 |
| 2017/0243193 A1* | 8/2017 | Manian | G06Q 20/3829 |
| 2017/0250815 A1* | 8/2017 | Cuende | G06Q 20/401 |
| 2017/0257358 A1* | 9/2017 | Ebrahimi | H04L 9/3236 |
| 2017/0262862 A1* | 9/2017 | Aljawhari | G06Q 30/0185 |
| 2017/0287090 A1* | 10/2017 | Hunn | G06F 40/12 |
| 2017/0300627 A1* | 10/2017 | Giordano | G06F 21/6245 |
| 2017/0302635 A1* | 10/2017 | Humphries | H04L 51/08 |
| 2017/0324711 A1* | 11/2017 | Feeney | H04L 9/3247 |
| 2017/0331635 A1* | 11/2017 | Barinov | H04L 9/3236 |
| 2017/0331810 A1* | 11/2017 | Kurian | H04L 63/083 |
| 2017/0344580 A1* | 11/2017 | King | H04L 9/3247 |
| 2017/0344987 A1* | 11/2017 | Davis | G06F 16/24575 |
| 2017/0346693 A1* | 11/2017 | Dix | H04L 41/0803 |
| 2017/0353314 A1* | 12/2017 | Steeves | G06F 21/604 |
| 2017/0364450 A1* | 12/2017 | Struttmann | H04L 9/3297 |
| 2017/0364698 A1* | 12/2017 | Goldfarb | G06F 16/9024 |
| 2017/0364699 A1* | 12/2017 | Goldfarb | G06F 16/2455 |
| 2017/0364700 A1* | 12/2017 | Goldfarb | H04L 9/3247 |
| 2017/0364701 A1* | 12/2017 | Struttmann | G06F 21/6218 |
| 2017/0366353 A1* | 12/2017 | Struttmann | G06F 21/6218 |
| 2017/0366533 A1* | 12/2017 | Mayakontla | H04L 63/061 |
| 2018/0004983 A1* | 1/2018 | Gonzalez | G06K 7/1417 |
| 2018/0005186 A1* | 1/2018 | Hunn | G06F 16/219 |
| 2018/0006807 A1* | 1/2018 | Suresh | H04L 9/0618 |
| 2018/0006820 A1* | 1/2018 | Arasu | G06F 16/00 |
| 2018/0018738 A1* | 1/2018 | Bernauer | H04L 9/3239 |
| 2018/0019867 A1* | 1/2018 | Davis | H04L 9/3239 |
| 2018/0025166 A1* | 1/2018 | Daniel | G06F 9/5011 |
| | | | 713/189 |
| 2018/0025167 A1* | 1/2018 | Bohli | H04L 9/14 |
| | | | 713/193 |
| 2018/0039667 A1* | 2/2018 | Pierce | G06F 16/2379 |
| 2018/0039786 A1* | 2/2018 | Naqvi | H04L 63/0428 |
| 2018/0068091 A1* | 3/2018 | Gaidar | G06F 21/10 |
| 2018/0068130 A1* | 3/2018 | Chan | G06F 21/606 |
| 2018/0075434 A1* | 3/2018 | Supernault | H04W 12/065 |
| 2018/0075570 A1* | 3/2018 | Arce | G06K 19/06103 |
| 2018/0077565 A1* | 3/2018 | Sharif | H04W 12/12 |
| 2018/0082026 A1* | 3/2018 | Schneider | G06F 21/32 |
| 2018/0082074 A1* | 3/2018 | Nunes | G06F 21/608 |
| 2018/0082256 A1* | 3/2018 | Tummuru | H04L 9/3297 |
| 2018/0082296 A1* | 3/2018 | Brashers | H04L 9/3236 |
| 2018/0083786 A1* | 3/2018 | Dierks | H04L 9/3297 |
| 2018/0096042 A1* | 4/2018 | Kuzma | H04L 9/3297 |
| 2018/0101684 A1* | 4/2018 | Murphy | G06F 21/64 |
| 2018/0101844 A1* | 4/2018 | Song | H04L 9/3247 |
| 2018/0101848 A1* | 4/2018 | Castagna | H04L 9/3236 |
| 2018/0101914 A1* | 4/2018 | Samuel | G06Q 20/401 |
| 2018/0103042 A1* | 4/2018 | Castagna | H04L 63/0428 |
| 2018/0109516 A1* | 4/2018 | Song | H04L 9/3239 |
| 2018/0115413 A1* | 4/2018 | King | H04L 9/30 |
| 2018/0115416 A1* | 4/2018 | Diehl | H04L 9/0819 |
| 2018/0115538 A1* | 4/2018 | Blake | H04L 9/14 |
| 2018/0117446 A1* | 5/2018 | Tran | A42B 3/0433 |
| 2018/0117447 A1* | 5/2018 | Tran | G06Q 20/382 |
| 2018/0121635 A1* | 5/2018 | Tormasov | H04L 9/3236 |
| 2018/0130034 A1* | 5/2018 | Taylor | G06Q 20/38215 |
| 2018/0137292 A1* | 5/2018 | Sanso | G06F 21/6209 |
| 2018/0139056 A1* | 5/2018 | Imai | H04L 9/14 |
| 2018/0150647 A1* | 5/2018 | Naqvi | H04L 9/321 |
| 2018/0150835 A1* | 5/2018 | Hunt | G06Q 20/3827 |
| 2018/0152297 A1* | 5/2018 | Fielding | H04L 9/3239 |
| 2018/0157855 A1* | 6/2018 | Hase | H04L 9/3226 |
| 2018/0159689 A1* | 6/2018 | Keuffer | H04L 9/3221 |
| 2018/0165255 A1* | 6/2018 | Gafford | G09B 5/06 |
| 2018/0174122 A1* | 6/2018 | Mattingly | H04L 9/3239 |
| 2018/0181904 A1* | 6/2018 | Wilkinson | G06Q 10/083 |
| 2018/0183600 A1* | 6/2018 | Davis | G06F 16/951 |
| 2018/0183601 A1* | 6/2018 | Campagna | G06F 21/602 |
| 2018/0189312 A1* | 7/2018 | Alas | H04L 9/3239 |
| 2018/0189730 A1* | 7/2018 | Wilkinson | G07F 17/13 |
| 2018/0189755 A1* | 7/2018 | Kilpatrick | H04L 67/10 |
| 2018/0198624 A1* | 7/2018 | Bisti | H04L 9/0891 |
| 2018/0198794 A1* | 7/2018 | Huh | H04L 63/10 |
| 2018/0204213 A1* | 7/2018 | Zappier | H04L 63/08 |
| 2018/0205552 A1* | 7/2018 | Struttmann | G06F 21/602 |
| 2018/0205555 A1* | 7/2018 | Watanabe | H04L 9/3226 |
| 2018/0212782 A1* | 7/2018 | Csik | G06F 21/64 |
| 2018/0219669 A1* | 8/2018 | Chen | H04L 9/002 |
| 2018/0219681 A1* | 8/2018 | Geiman | H04L 9/3231 |
| 2018/0219683 A1* | 8/2018 | Deery | H04L 9/3239 |
| 2018/0219685 A1* | 8/2018 | Deery | H04L 9/3236 |
| 2018/0225640 A1* | 8/2018 | Chapman | G06Q 20/401 |
| 2018/0225660 A1* | 8/2018 | Chapman | G06Q 20/10 |
| 2018/0227116 A1* | 8/2018 | Chapman | G06F 21/64 |
| 2018/0227131 A1* | 8/2018 | Ebrahimi | H04L 9/3297 |
| 2018/0227293 A1* | 8/2018 | Uhr | H04L 9/3268 |
| 2018/0241565 A1* | 8/2018 | Paolini-Subramanya | H04L 9/3239 |
| 2018/0241573 A1* | 8/2018 | Ramathal | G06Q 20/02 |
| 2018/0247302 A1* | 8/2018 | Armstrong | G06Q 20/3827 |
| 2018/0253464 A1* | 9/2018 | Kohli | G06F 16/219 |
| 2018/0253702 A1* | 9/2018 | Dowding | H04L 63/123 |
| 2018/0255090 A1* | 9/2018 | Kozloski | H04L 67/02 |
| 2018/0255130 A1* | 9/2018 | Kozloski | H04L 67/535 |
| 2018/0260212 A1* | 9/2018 | Wisnovsky | G06F 16/134 |
| 2018/0260888 A1* | 9/2018 | Paolini-Subramanya | G06Q 40/03 |
| 2018/0260889 A1* | 9/2018 | Paolini-Subramanya | H04L 9/0643 |
| 2018/0268382 A1* | 9/2018 | Wasserman | H04L 9/3247 |
| 2018/0268504 A1* | 9/2018 | Paolini-Subramanya | G06Q 20/3823 |
| 2018/0276745 A1* | 9/2018 | Paolini-Subramanya | H04L 9/50 |
| 2018/0278423 A1* | 9/2018 | Bianzino | H04L 9/3297 |
| 2018/0285412 A1* | 10/2018 | Zhuang | H04L 9/0637 |
| 2018/0285585 A1* | 10/2018 | Daniel | G06N 20/00 |
| 2018/0285970 A1* | 10/2018 | Snow | H04L 9/3247 |
| 2018/0287800 A1* | 10/2018 | Chapman | H04L 9/3226 |
| 2018/0288101 A1* | 10/2018 | Sharma | H04L 9/3236 |
| 2018/0293363 A1* | 10/2018 | Asati | G06F 21/10 |
| 2018/0294955 A1* | 10/2018 | Rhie | G06F 16/2272 |
| 2018/0294956 A1* | 10/2018 | O'Brien | H04L 9/3242 |
| 2018/0294966 A1* | 10/2018 | Hyun | H04L 9/3226 |
| 2018/0302417 A1* | 10/2018 | Wilson | H04L 9/3271 |
| 2018/0307857 A1* | 10/2018 | Beecham | G06F 16/9024 |
| 2018/0308098 A1* | 10/2018 | Ebrahimi | H04L 9/3268 |
| 2018/0315145 A1* | 11/2018 | Darnell | H04L 9/3239 |
| 2018/0315309 A1* | 11/2018 | Becker | G08G 1/133 |
| 2018/0316509 A1* | 11/2018 | Gardner | H04L 9/3247 |
| 2018/0316653 A1* | 11/2018 | Kanza | H04L 63/123 |
| 2018/0323964 A1* | 11/2018 | Watanabe | H04L 9/0637 |

(56) References Cited

U.S. PATENT DOCUMENTS

| | | | |
|---|---|---|---|
| 2018/0323980 A1* | 11/2018 | Ahn | H04L 9/3236 |
| 2018/0331832 A1* | 11/2018 | Pulsifer | H04L 9/3247 |
| 2018/0337882 A1* | 11/2018 | Li | G06Q 20/3825 |
| 2018/0342036 A1* | 11/2018 | Zachary | H04L 9/3239 |
| 2018/0343126 A1* | 11/2018 | Fallah | H04L 9/3297 |
| 2018/0349879 A1* | 12/2018 | High | G06Q 20/405 |
| 2018/0349896 A1* | 12/2018 | Arora | G06Q 20/3829 |
| 2018/0349968 A1* | 12/2018 | O'Brien | H04L 9/3297 |
| 2018/0351732 A1* | 12/2018 | Wang | G06F 16/1805 |
| 2018/0352104 A1* | 12/2018 | Meng | G06F 21/60 |
| 2018/0356236 A1* | 12/2018 | Lawrenson | H04L 9/3247 |
| 2018/0365201 A1* | 12/2018 | Hunn | G06F 40/143 |
| 2018/0374094 A1* | 12/2018 | Kohli | G06Q 20/065 |
| 2018/0375668 A1* | 12/2018 | Diehl | H04L 9/0637 |
| 2018/0376336 A1* | 12/2018 | Turner | H04W 12/47 |
| 2019/0005268 A1* | 1/2019 | Gupta | G06Q 10/10 |
| 2019/0013948 A1* | 1/2019 | Mercuri | G06F 16/27 |
| 2019/0014124 A1* | 1/2019 | Reddy | H04L 41/5096 |
| 2019/0019367 A1* | 1/2019 | Unagami | H04L 9/3239 |
| 2019/0020468 A1* | 1/2019 | Rosenoer | H04L 9/3242 |
| 2019/0020786 A1* | 1/2019 | Tachi | H04N 1/32475 |
| 2019/0034465 A1* | 1/2019 | Shimamura | G06Q 20/02 |
| 2019/0034936 A1* | 1/2019 | Nolan | G06Q 20/42 |
| 2019/0036702 A1* | 1/2019 | Kano | G09C 1/00 |
| 2019/0044727 A1* | 2/2019 | Scott | H04L 9/0891 |
| 2019/0050541 A1* | 2/2019 | Wright | G06Q 20/123 |
| 2019/0052453 A1* | 2/2019 | de Ligt | H04L 9/0637 |
| 2019/0057382 A1* | 2/2019 | Wright | G06Q 20/3678 |
| 2019/0058590 A1* | 2/2019 | Watanabe | G06Q 20/065 |
| 2019/0065709 A1* | 2/2019 | Salomon | H04L 9/0643 |
| 2019/0066119 A1* | 2/2019 | Sengupta | G06F 21/64 |
| 2019/0073487 A1* | 3/2019 | Rong | H04L 63/12 |
| 2019/0080392 A1* | 3/2019 | Youb | G06Q 20/38215 |
| 2019/0087893 A1* | 3/2019 | Pellew | G06Q 20/102 |
| 2019/0097790 A1* | 3/2019 | Li | H04L 9/12 |
| 2019/0103192 A1* | 4/2019 | Bent | G16H 10/60 |
| 2019/0108542 A1* | 4/2019 | Durvasula | H04L 9/3297 |
| 2019/0116034 A1* | 4/2019 | Sengupta | G06Q 20/065 |
| 2019/0123889 A1* | 4/2019 | Schmidt-Karaca | H04L 9/0618 |
| 2019/0123890 A1* | 4/2019 | Scott | H04L 9/3239 |
| 2019/0130399 A1* | 5/2019 | Wright | G06Q 40/03 |
| 2019/0132130 A1* | 5/2019 | Anantha | G06F 8/60 |
| 2019/0132138 A1* | 5/2019 | Finlow-Bates | H04L 67/1097 |
| 2019/0147438 A1* | 5/2019 | Micali | G06Q 20/4016 705/71 |
| 2019/0160660 A1* | 5/2019 | Husain | B25J 9/1694 |
| 2019/0163883 A1* | 5/2019 | Savanah | H04L 67/104 |
| 2019/0163887 A1* | 5/2019 | Frederick | H04L 9/3239 |
| 2019/0163896 A1* | 5/2019 | Balaraman | G06F 21/41 |
| 2019/0164157 A1* | 5/2019 | Balaraman | H04L 9/3297 |
| 2019/0164160 A1* | 5/2019 | Zamora Duran | G06K 19/06187 |
| 2019/0164241 A1* | 5/2019 | Bässler | G06Q 50/18 |
| 2019/0166133 A1* | 5/2019 | Frederick | G06F 21/44 |
| 2019/0171849 A1* | 6/2019 | Assenmacher | H04L 9/0643 |
| 2019/0173667 A1* | 6/2019 | Wang | H04L 63/08 |
| 2019/0180276 A1* | 6/2019 | Lee | H04L 9/3247 |
| 2019/0182257 A1* | 6/2019 | Lee | G06Q 10/06315 |
| 2019/0188306 A1* | 6/2019 | Lehr | G06Q 10/04 |
| 2019/0188706 A1* | 6/2019 | McCurtis | H04L 9/3239 |
| 2019/0190698 A1* | 6/2019 | Nuzzi | H04L 9/3247 |
| 2019/0198144 A1* | 6/2019 | Blackley | H04L 9/3239 |
| 2019/0199514 A1* | 6/2019 | Hari | H04L 67/104 |
| 2019/0205558 A1* | 7/2019 | Gonzales, Jr. | G06F 21/602 |
| 2019/0207748 A1* | 7/2019 | Courtney | H04L 9/30 |
| 2019/0207767 A1* | 7/2019 | Ahn | H04L 9/3236 |
| 2019/0213821 A1* | 7/2019 | Davis | G07C 13/00 |
| 2019/0215159 A1* | 7/2019 | Notani | H04L 9/3297 |
| 2019/0220831 A1* | 7/2019 | Rangarajan | H04L 9/3239 |
| 2019/0228386 A1* | 7/2019 | Onnainty | H04L 9/3239 |
| 2019/0229918 A1* | 7/2019 | Naqvi | H04L 9/3218 |
| 2019/0230073 A1* | 7/2019 | Patel | G06Q 20/3674 |
| 2019/0236119 A1* | 8/2019 | Lancioni | G09C 5/00 |
| 2019/0238317 A1* | 8/2019 | Nazarian | G06F 21/64 |
| 2019/0238340 A1* | 8/2019 | Wang | H04L 9/3247 |
| 2019/0244227 A1* | 8/2019 | Inoue | H04L 63/0428 |
| 2019/0244241 A1* | 8/2019 | Hain | H04L 9/3236 |
| 2019/0251199 A1* | 8/2019 | Klianev | G06Q 40/04 |
| 2019/0251231 A1* | 8/2019 | Huang | H04L 9/088 |
| 2019/0251234 A1* | 8/2019 | Liu | G06Q 20/385 |
| 2019/0251573 A1* | 8/2019 | Toyota | H04L 9/3236 |
| 2019/0253260 A1* | 8/2019 | Uehara | H04L 9/3263 |
| 2019/0253523 A1* | 8/2019 | Raduchel | H04L 67/306 |
| 2019/0266650 A1* | 8/2019 | Chapman | H04L 9/0643 |
| 2019/0268139 A1* | 8/2019 | Kurian | H04L 9/0637 |
| 2019/0268162 A1* | 8/2019 | Sahagun | G06F 16/2455 |
| 2019/0268466 A1* | 8/2019 | Inoue | H04L 9/3247 |
| 2019/0273616 A1* | 9/2019 | Bres | H04L 9/3236 |
| 2019/0278852 A1* | 9/2019 | Jayachandran | H04L 9/0643 |
| 2019/0279210 A1* | 9/2019 | Pen | H04L 9/3239 |
| 2019/0280872 A1* | 9/2019 | Falk | G06F 21/64 |
| 2019/0282906 A1* | 9/2019 | Yong | A63F 13/69 |
| 2019/0289018 A1* | 9/2019 | Metzger | H04L 9/50 |
| 2019/0289454 A1* | 9/2019 | Inoue | H04W 12/40 |
| 2019/0296907 A1* | 9/2019 | Versteeg | H04L 9/50 |
| 2019/0303920 A1* | 10/2019 | Balaraman | H04L 67/1042 |
| 2019/0306190 A1* | 10/2019 | Suraparaju | G06F 21/602 |
| 2019/0306230 A1* | 10/2019 | Purushothaman | H04L 67/125 |
| 2019/0310980 A1* | 10/2019 | Zhang | G06F 16/2365 |
| 2019/0318103 A1* | 10/2019 | Anton | G06Q 20/0655 |
| 2019/0318129 A1* | 10/2019 | David | G06F 16/27 |
| 2019/0319948 A1* | 10/2019 | Triola | H04L 9/3247 |
| 2019/0325473 A1* | 10/2019 | Swamidurai | H04L 9/50 |
| 2019/0327080 A1* | 10/2019 | Liu | H04L 9/0891 |
| 2019/0332783 A1* | 10/2019 | Bhardwaj | G06F 21/645 |
| 2019/0332931 A1* | 10/2019 | Montantes | G06F 3/017 |
| 2019/0333096 A1* | 10/2019 | Johnson | H04L 63/123 |
| 2019/0334715 A1* | 10/2019 | Gray | H04L 9/30 |
| 2019/0334726 A1* | 10/2019 | Kelly | H04L 9/3247 |
| 2019/0334920 A1* | 10/2019 | Kelly | H04L 9/3239 |
| 2019/0340267 A1* | 11/2019 | Vo | G06F 16/2365 |
| 2019/0342077 A1* | 11/2019 | McMurdie | H04L 63/123 |
| 2019/0347433 A1* | 11/2019 | Chakravorty | H04L 9/30 |
| 2019/0347444 A1* | 11/2019 | Lowagie | G06F 21/602 |
| 2019/0347738 A1* | 11/2019 | Ledesma | G06Q 40/08 |
| 2019/0348158 A1* | 11/2019 | Livesay | H04L 9/3239 |
| 2019/0349426 A1* | 11/2019 | Smith | G06F 16/1834 |
| 2019/0354607 A1* | 11/2019 | Snow | H04L 67/535 |
| 2019/0354611 A1* | 11/2019 | Snow | G06Q 20/382 |
| 2019/0354944 A1* | 11/2019 | Russinovich | H04L 9/3239 |
| 2019/0354964 A1* | 11/2019 | Snow | H04L 9/3236 |
| 2019/0356473 A1* | 11/2019 | Rosenoer | G06Q 20/065 |
| 2019/0356733 A1* | 11/2019 | Snow | G06F 16/27 |
| 2019/0361917 A1* | 11/2019 | Tran | H04W 12/108 |
| 2019/0362376 A1* | 11/2019 | Newell | H04L 9/3239 |
| 2019/0363873 A1* | 11/2019 | Fry | H04L 9/50 |
| 2019/0370760 A1* | 12/2019 | Kundu | H04L 9/3239 |
| 2019/0370866 A1* | 12/2019 | Lawbaugh | G06Q 30/0277 |
| 2019/0372772 A1* | 12/2019 | Novotny | H04L 9/3239 |
| 2019/0377811 A1* | 12/2019 | Aleksander | H04L 9/3236 |
| 2019/0378139 A1* | 12/2019 | Stribady | H04L 67/125 |
| 2019/0378220 A1* | 12/2019 | Ibrahim | G06Q 20/3224 |
| 2019/0379531 A1* | 12/2019 | Aleksander | H04L 9/3247 |
| 2019/0379673 A1* | 12/2019 | Coonrod | H04L 9/50 |
| 2019/0384892 A1* | 12/2019 | Holland | G06F 16/2379 |
| 2019/0385269 A1* | 12/2019 | Zachary | H04N 7/18 |
| 2019/0392119 A1* | 12/2019 | Rahiman | H04L 9/3239 |
| 2019/0392178 A1* | 12/2019 | rice | H04L 9/3247 |
| 2019/0392536 A1* | 12/2019 | Rice | H04L 9/0643 |
| 2019/0394046 A1* | 12/2019 | Su | G06F 8/654 |
| 2020/0007316 A1* | 1/2020 | Krishnamacharya | H04L 9/3231 |
| 2020/0007333 A1* | 1/2020 | Young | H04L 9/50 |
| 2020/0007343 A1* | 1/2020 | Evans | H04L 9/50 |
| 2020/0007344 A1* | 1/2020 | Chepak, Jr. | H04L 9/0643 |
| 2020/0007511 A1* | 1/2020 | Van de Groenendaal | H04L 63/0428 |
| 2020/0007581 A1* | 1/2020 | Vouk | H04L 63/20 |
| 2020/0012731 A1* | 1/2020 | Deshpande | H04L 9/0643 |
| 2020/0012766 A1* | 1/2020 | Huang | G06F 21/6209 |
| 2020/0012805 A1* | 1/2020 | Winarski | H04L 9/0894 |
| 2020/0014527 A1* | 1/2020 | Subramaniam | G06F 21/10 |
| 2020/0014529 A1* | 1/2020 | Kanza | H04W 12/64 |
| 2020/0021443 A1* | 1/2020 | Falk | H04L 9/3247 |

(56) References Cited

U.S. PATENT DOCUMENTS

| | | | |
|---|---|---|---|
| 2020/0057869 A1* | 2/2020 | Wilke | H04L 9/3236 |
| 2020/0057871 A1* | 2/2020 | Hartley | G06F 40/174 |
| 2020/0059487 A1* | 2/2020 | Malik | H04L 9/0643 |
| 2020/0076596 A1* | 3/2020 | Chopart | H04L 9/0643 |
| 2020/0089915 A1* | 3/2020 | Falk | H04L 9/3297 |
| 2020/0125720 A1* | 4/2020 | Englund | G06F 21/52 |
| 2020/0126070 A1* | 4/2020 | Joseph | H04L 9/3239 |
| 2020/0127835 A1* | 4/2020 | Fletcher | H04L 9/0637 |
| 2020/0127860 A1* | 4/2020 | Aschauer | H04L 9/3236 |
| 2020/0134206 A1* | 4/2020 | Thekadath | G06F 21/602 |
| 2020/0145219 A1* | 5/2020 | Sebastian | G06F 21/32 |
| 2020/0162264 A1* | 5/2020 | Zamani | H04L 41/0893 |
| 2020/0167870 A1* | 5/2020 | Isaacson | G06Q 50/265 |
| 2020/0177563 A1* | 6/2020 | Huapaya | H04L 63/0435 |
| 2020/0184489 A1* | 6/2020 | Negi | G06Q 10/0832 |
| 2020/0186354 A1* | 6/2020 | Balinsky | G06K 15/4095 |
| 2020/0186355 A1* | 6/2020 | Davies | H04L 63/123 |
| 2020/0186361 A1* | 6/2020 | Almgren | H04L 9/3242 |
| 2020/0204346 A1* | 6/2020 | Trevethan | G06F 21/64 |
| 2020/0213085 A1* | 7/2020 | Fletcher | G06Q 20/3829 |
| 2020/0218830 A1* | 7/2020 | Topart | H04L 9/30 |
| 2020/0226589 A1* | 7/2020 | Nakamura | G06Q 20/38 |
| 2020/0244470 A1* | 7/2020 | Ruckriemen | G06F 21/645 |
| 2020/0244472 A1* | 7/2020 | Dinkelaker | H04L 9/50 |
| 2020/0258176 A1* | 8/2020 | Gibson | G06F 21/32 |
| 2020/0259634 A1* | 8/2020 | Wilke | H03M 13/091 |
| 2020/0272618 A1* | 8/2020 | Hughes | H04L 9/3236 |
| 2020/0279233 A1* | 9/2020 | Nakamura | H04L 9/50 |
| 2020/0295941 A1* | 9/2020 | Daniel | H04L 9/50 |
| 2020/0322308 A1* | 10/2020 | Kempf | H04L 9/3236 |
| 2020/0356547 A1* | 11/2020 | Furukawa | G06F 16/2379 |
| 2020/0366495 A1* | 11/2020 | Mahoney | H04L 9/12 |
| 2020/0371965 A1* | 11/2020 | Medvedeva | H04L 9/3239 |
| 2020/0372184 A1* | 11/2020 | Meirosu | H04L 9/3247 |
| 2020/0379979 A1* | 12/2020 | Thekadath | H04L 9/3239 |
| 2020/0380090 A1* | 12/2020 | Marion | G06F 21/64 |
| 2020/0382277 A1* | 12/2020 | Kong | H04L 9/3297 |
| 2020/0402026 A1* | 12/2020 | Furukawa | G06Q 20/401 |
| 2020/0410616 A1* | 12/2020 | Theunis | G06Q 20/1235 |
| 2021/0144012 A1* | 5/2021 | Ghanea-Hercock | H04L 9/3073 |
| 2021/0160056 A1* | 5/2021 | Yan | H04L 63/126 |
| 2021/0166221 A1* | 6/2021 | Noh | G06Q 20/3825 |
| 2021/0167942 A1* | 6/2021 | Zhang | H04L 9/0618 |
| 2021/0243201 A1* | 8/2021 | Tandel | H04L 9/0897 |
| 2021/0256007 A1* | 8/2021 | Wu | H04L 9/3239 |
| 2021/0256016 A1* | 8/2021 | Gramoli | G06F 16/2365 |
| 2021/0264531 A1* | 8/2021 | Leise | H04L 9/3239 |
| 2021/0294920 A1* | 9/2021 | Sachs | G06F 21/60 |
| 2021/0326992 A1* | 10/2021 | Leise | H04L 9/3249 |
| 2021/0342946 A1* | 11/2021 | Leise | G06Q 20/4015 |
| 2022/0058614 A1* | 2/2022 | Savanah | H04L 9/0618 |
| 2023/0274373 A1* | 8/2023 | Dixit | G06Q 50/18 705/311 |

FOREIGN PATENT DOCUMENTS

| | | | | |
|---|---|---|---|---|
| WO | WO-2017136879 A1 * | 8/2017 | | G06F 21/645 |
| WO | 2020012156 A1 | 1/2020 | | |

OTHER PUBLICATIONS

Espacenet Translation of JP2005176008A, pp. 1-20 (Year: 2005).*
Jacobovitz "Blockchain for Identity Management," Dec. 2016, Technical Report #16-02, pp. 1-19 (Year: 2016).*
Bhargavan et al "Formal Verification of Smart Contracts," Short Paper, pp. 91-96 (Year: 2016).*
Takeuchi et al "A Limited-Use Asset Management System on the Blockchain Platform with an Extended Open Assets Protocol," IEEE, pp. 1-7 (Year: 2018).*
Ahram et al "Blockchain Technology Innovations," 2017 IEEE Technology & Engineering Management Conference (TEMSCON), IEEE, pp. 1-5 (Year: 2017).*
Tsai et al "Intellectual-Property Blockchain-based Protection Model for Microfilms," 2017 IEEE Symposium on Service-Oriented System Engineering, IEEE, pp. 174-178 (Year: 2017).*
Zhang et al "A Blockchain-based Process Provenance for Cloud Forensics," 2017 3rd IEEE International Conference on Computer and Communications, IEEE, pp. 2470-2473 (Year: 2017).*
Buchmann et al "Enhancing Breeder Document Long-Term Security using Blockchain Technology," 2017 IEEE 41st Annual Computer Software and Applications Conference, IEEE Computer Society, pp. 744-748 (Year: 2017).*
World International Property Organization, International Search Report for International Application No. PCT/GB2019/051851, mail date Sep. 24, 2019, 3 pages.
John Collomosse et al., "ARCHANGEL : Trusted Archives of Digital Public Documents", Journal, arXiv.org, Apr. 23, 2018, Cornell University Library, 201 Olin Library Cornell University Ithaca, NY 14853, published Apr. 23, 2018.
Anonymous, "What is proof of existence", Article, https://proofofexistence.com/about, 2 pages, last accessed Sep. 18, 2017.
Anonymous: "PDF Split and Merge—Wikipedia", Feb. 9, 2018 (Feb. 9, 2018), pp. 1-2, XP055622112, Retrieved from the Internet <URL:https://en.wikipedia.org/w/index.php?title=PDF_Split_and_Merge&oldid=824790607> [retrieved on Sep. 13, 2019], last accessed Sep. 13, 2019.

* cited by examiner

METHOD AND SYSTEM FOR MANAGING DIGITAL EVIDENCE USING A BLOCKCHAIN

RELATED APPLICATION INFORMATION

This patent claims priority from International PCT Patent Application No. PCT/GB2019/051851, filed Jun. 28, 2019 entitled, "A METHOD AND SYSTEM FOR MANAGING DIGITAL EVIDENCE USING A BLOCKCHAIN", which claims priority to United Kingdom Application No. 1811263.1, filed Jul. 10, 2018, all of which are incorporated herein by reference in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

The present invention relates to a method and system for managing digital evidence using a blockchain. The present invention more particularly relates to a method and system for enabling a user to verify the authenticity of evidence using the blockchain.

In a typical court case there is a large volume of evidence which must be collated and presented to the court. Traditionally this evidence was submitted in the form of paper bundles but nowadays evidence is often provided electronically in the form of electronic documents, images, sound recordings or video recordings.

The problem with electronic evidence is that it is not possible to be certain that the evidence presented by a system is identical to the evidence that has been loaded into the system. For instance, a user cannot be absolutely sure that a piece of electronic evidence has not been tampered with in some way to change the meaning or weight of the evidence.

In the case of video evidence, it can be extremely difficult to detect whether the content of the video file has been edited. For instance, a video could have been edited to remove the word "not" from a portion of the video footage to completely change the meaning of the evidence.

A similar problem arises for digital image evidence where it can be very difficult to detect whether an image has been edited, for instance to remove an object or a person from the image.

The problem can also arise with electronic documents, where it is difficult and time consuming to check an electronic document for tampering (e.g. by removing or changing words). The task becomes almost impossible for large cases where there can be a very large number of pages of evidence (e.g. 250,000+ pages).

There is a need for a method and system for managing digital evidence which alleviates at least some of the problems described above.

SUMMARY

The present invention seeks to provide an improved method and system for managing digital evidence using a blockchain.

According to one aspect of the present invention, there is provided a computer-implemented method for managing digital evidence using a blockchain, the method comprising: receiving an evidence data file, the evidence data file being identified by: an evidence identifier, and a hash code computed from the evidence data file; generating a block for the blockchain by combining data indicative of: a hash of a previous block in the blockchain, the evidence identifier, and the hash code computed from the evidence data file; and storing the generated block as a new block in the blockchain, wherein the method further comprises: outputting at least part of the data in the blockchain in response to a user request to enable a user to verify the authenticity of the evidence data file using the data in the blockchain.

Preferably, the method further comprises: assigning the evidence identifier to the evidence data file; and computing the hash code from the evidence data file.

Conveniently, the method further comprises: performing a transformation operation on the evidence data file to produce a transformed evidence data file; generating the block for the blockchain by further combining data indicative of: the transformation operation, and a timestamp indicating the time at which the transformation operation was performed, wherein the method further comprises: outputting at least part of the data in the blockchain in response to a user request to enable a user to verify the authenticity of the transformed evidence data file using the data in the blockchain.

Advantageously, the method further comprises: performing a plurality of transformation operations on the evidence data file to produce the transformed evidence data file.

Preferably, each transformation operation comprises converting an evidence data file document into a Portable Document Format (PDF) file.

Conveniently, the method further comprises combining at least one page from the evidence data file with at least one page from a further evidence data file and generating a paginated evidence data file in which each page of the file carries a page number.

Advantageously, the method further comprises: performing an image transformation operation on at least part of the evidence data file to generate a transformed evidence data file in the form of an image file which, when decoded and viewed on a display screen, represents the appearance of at least part of the evidence data file.

Preferably, the method comprises generating a first image file and a second image file, wherein the image resolution of the first image file is lower than the image resolution of the second image file.

Conveniently, the method further comprises: decoding and displaying the of each generated image file in response to a request from a user.

Advantageously, the method further comprises: displaying an authenticity indicator to a user with each image file, the authenticity indicator being indicative of data in the blockchain to notify a user viewing the authenticity indicator that the image file is verified as authentic by the data in the blockchain.

Preferably, the method further comprises: storing the evidence data file and each transformed evidence data file in a secure memory, the secure memory being configured to minimise or prevent an unauthorised user from accessing the evidence data file and each transformed evidence data file.

Conveniently, the method comprises receiving a plurality of evidence data files and repeating the steps of the method for each of the plurality of evidence data files.

According to another aspect of the present invention, there is provided a computer-implemented method for managing digital evidence using a blockchain, the method comprising: receiving a user request to verify the authenticity of an evidence data file, the evidence data file being identified by: an evidence identifier, and a hash code computed from the evidence data file; searching a blockchain for the evidence identifier; and if the evidence identifier is found in the blockchain, outputting an authenticity indicator to the user to notify the user that the evidence data file is verified as authentic by the data in the blockchain.

Preferably, the method further comprises: receiving a user request to access an evidence data file; outputting a transformed evidence data file to the user, the transformed evidence data file being a transformation of the evidence data file requested by the user and being identified by the same evidence identifier as the evidence data file requested by the user; and outputting the authenticity indicator to the user to verify the authenticity of the transformed evidence data file only if the evidence identifier is found the blockchain.

According to a further aspect of the present invention, there is provided a device or system comprising: a processor; and a memory and being configured to perform the methods of the claims recited hereinafter.

According to another aspect of the present invention, there is provided a computer program having instructions which, when executed by a computing device or system, cause the computing device or system to perform the methods of the claims recited hereinafter According to another aspect of the present invention, there is provided a data stream which is representative of a computer program.

According to another aspect of the present invention, there is provided a computer readable medium storing instructions which, when executed by a computing device or system, cause the computing device or system to perform the methods of the claims recited hereinafter

DRAWINGS

So that the present invention may be more readily understood, embodiments of the present invention will now be described, by way of example, with reference to the accompanying drawings, in which.

DETAILED DESCRIPTION

Figure 1:
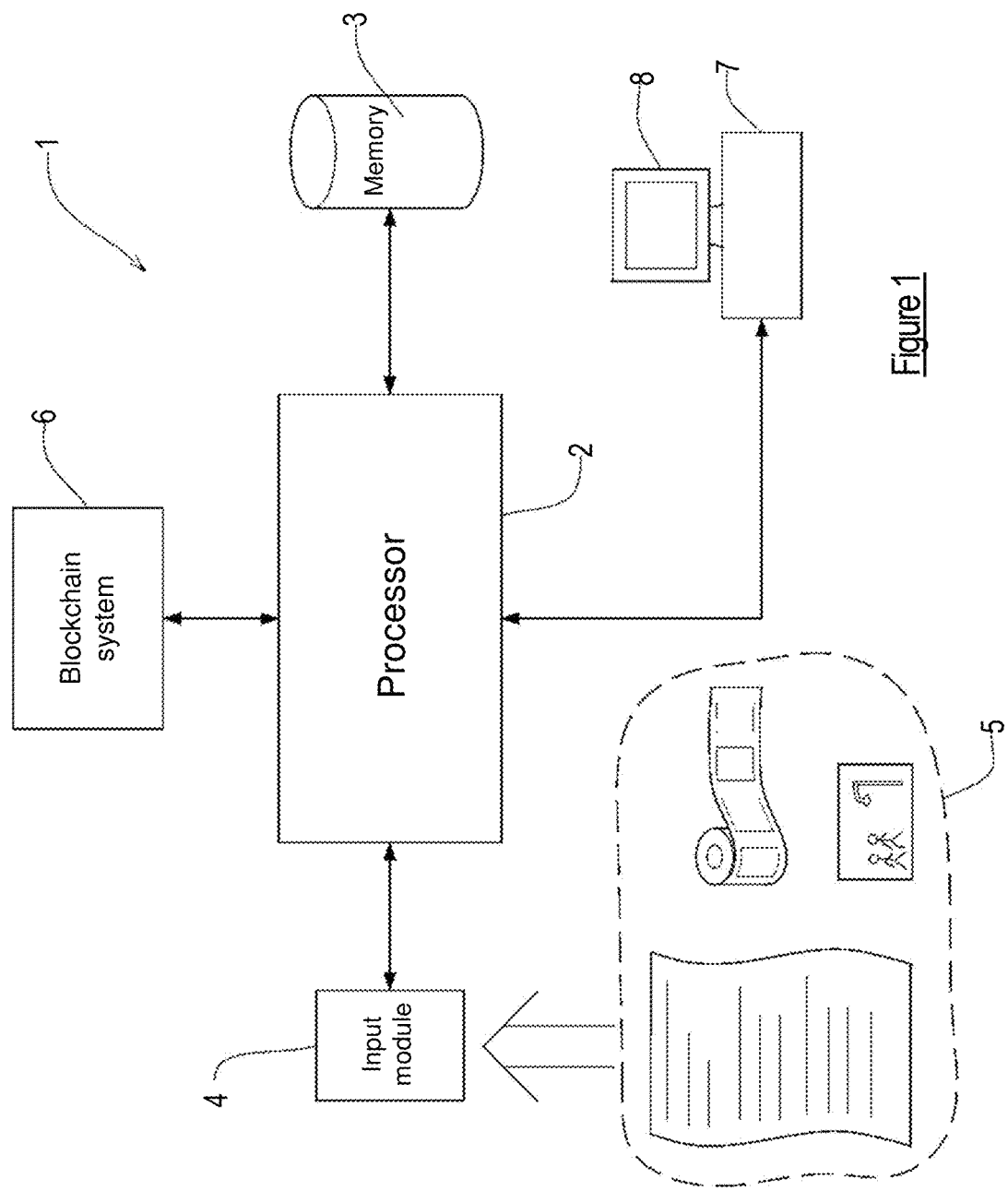
FIG. 1 is schematic diagram of a system of some embodiments.

Referring initially to FIG. 1 of the accompanying drawings, a system 1 of some embodiment comprises a processor 2 and a memory 3 which is coupled for communication with the processor 2. In some embodiments, the processor 2 and the memory 3 are provided within a computing system, such as a server, or a plurality of networked computing systems or networked servers. The memory 3 stores instructions which, when executed by the processor 2, perform a method of some embodiments of the invention.

The system 1 further comprises an input module 4 which is coupled for communication with the processor 2. The input module 4 is configured to receive an evidence data file 5. The evidence data file 5 is an electronic data file which is selected from a group including, but not limited to, a document file, an image file, a sound file or a video file. The evidence data file may be in any data format, such as Microsoft Word™ or a Portable Document Format (PDF), a JPEG image format or an MPEG video format.

In some embodiments, the evidence data file 5 is a document file with a filetype selected from a group including, but not limited to: txt, att, rtf, doc, wbk, dot, docx, dotx, docm, dotm, htm, html, mht, odt, xml, xls, xlt, xla, xlsx, xltx, xlsm, xltm, xlam, xlsb, csv, pdf, ppt, pot, pps, ppa, pptx, potx, ppsx, pptm, potm, ppsm or msg.

In some embodiments, the evidence data file 5 is an image file with a filetype selected from a group including, but not limited to: bmp, png, gif, ico, jpg, jpeg, tiff or tif.

In some embodiments, the evidence data file 5 is an audio file with a filetype selected from a group including, but not limited to: aa, aac, aax, act, aiff, amr, ape, au, awb, dct, dss, dvf, flac, gsm, iklax, m4a, m4b, m4p, mmf, mp3, mpc, msv, ogg, oga, opus, raw, sln, tta, vox, way, wma or wv.

In some embodiments, the evidence data file 5 is a video file with a filetype selected from a group including, but not limited to: 264, 3g2, 3gp, 3gp2, 3gpp, 3gpp2, 3 mm, 3p2, 60d, 787, 89, aaf, aec, aep, aepx, aet, aetx, ajp, ale, am, amc, amv, amx, anim, anx, aqt, arcut, arf, asf, asx, avb, avc, avchd, avd, avi, avm, avp, ays, avv, awlive, axm, axv, bdm, bdmv, bdt2, bdt3, bik, bin, bix, bmc, bmk, bnp, box, bs4, bsf, bu, bvr, byu, camproj, camrec, camv, ced, cel, cine, cip, clk, clpi, cmmp, cmmtpl, cmproj, cmrec, cmv, cpi, cpvc, cst, cvc, cx3, d2v, d3v, dash, dat, day, db2, dce, dck, dcr, ddat, dif, dir, divx, dlx, dmb, dmsd, dmsd3d, dmsm, dmsm3d, dmss, dmx, dnc, dpa, dpg, dream, dsy, dv, dv-avi, dv4, dvdmedia, dvr, dvr-ms, dvx, dxr, dzm, dzp, dzt, edl, evo, exo, eye, eyetv, ezt, f4f, f4p, f4v, fbr, fbz, fcarch, fcp, fcproject, ffd, ffm, flc, flh, fli, fly, flx, fpdx, ftc, g64, gcs, gfp, gifv, gl, gom, grasp, gts, gvi, gyp, gxf, h264, hdmov, hdv, hkm, ifo, imovielibrary, imoviemobile, imovieproj, imovieproject, inp, int, ircp, irf, ism, ismc, ismclip, ismv, iva, ivf, ivr, ivs, izz, izzy, jmv, jss, jts, jtv, k3g, kdenlive, kmv, ktn, lrec, lrv, lsf, lsx, lvix, m15, mlpg, mlv, m21, m2a, m2p, m2t, m2ts, m2v, m4e, m4u, m4v, m75, mani, meta, mgv, mj2, mjp, mjpeg, mjpg, mk3d, mkv, mmv, mnv, mob, mod, modd, moff, moi, moov, mov, movie, mp21, mp2v, mp4, mp4infovid, mp4v, mpe, mpeg, mpeg1, mpeg2, mpeg4, mpf, mpg, mpg2, mpg4, mpgindex, mpl, mpls, mproj, mpsub, mpv, mpv2, mqv, msdvd, mse, msh, mswmm, mt2s, mts, mtv, mvb, mvc, mvd, mve, mvex, mvp, mvy, mxf, mxv, mys, ncor, nsv, ntp, nut, nuv, nvc, ogm, ogv, ogx, orv, osp, otrkey, pac, par, pds, pgi, photoshow, piv, pjs, playlist, plproj, pmf, pmv, pns, ppj, prel, pro, pro4dvd, pro5dvd, proqc, prproj, prtl, psb, psh, pssd, pva, pvr, pxv, qt, qtch, qtindex, qtl, qtm, qtz, r3d, rcd, rcproject, rcrec, rcut, rdb, rec, rm, rmd, rmp, rms, rmv, rmvb, roq, rp, rsx, rts, rum, rv, rvid, rvl, san, sbk, sbt, sbz, scc, scm, scn, screenflow, sdv, sec, sedprj, seq, sfd, sfera, sfvidcap, siv, smi, smil, smk, sml, smv, snagproj, spl, sqz, srt, ssf, ssm, stl, str, stx, svi, swf, swi, swt, tda3mt, tdt, tdx, theater, thp, tid, tivo, tix, tod, tp, tp0, tpd, tpr, trec, trp, ts, tsp, ttxt, tvlayer, tvrecording, tvs, tvshow, usf, usm, vbc, vcl, vcpf, vcr, vcv, vdo, vdr, vdx, veg, vem, vep, vf, vft, vfw, vfz, vgz, vid, video, viewlet, viv, vivo, vix, vlab, vmlf, vmlt, vob, vp3, vp6, vp7, vpj, vro, vs4, vse, vsp, vtt, w32, wcp, webm, wfsp, wgi, wimp, wm, wmd, wmmp, wmv, wmx, wot, wp3, wpl, wsve, wtv, wve, wvx, wxp, xej, xel, xesc, xfl, xlmv, xmv, xvid, y4m, yog, yuv, zeg, zm1, zm2, zm3 or zmv.

In some embodiments, the input module 4 is configured to digitise an item of evidence into an evidence data file. For instance, in some embodiments, the input module 4 comprises a scanner which is configured to scan a paper document to digitise the paper document into an electronic data file.

In some embodiments, the input module 4 is provided at the same location as the processor 2. However, in other embodiments, the input module 4 is provided at a remote location from the processor 2 and configured to communicate with the processor 2 via a network, such as the Internet. In embodiments where the input module 4 is remote from the processor 2, the input module 4 can be situated at a location where it is desirable for a user to input an evidence data file into the system 1, such as at the offices of a law firm.

The evidence data file 5 is identified by an evidence identifier and a hash code computed from the evidence data file. The evidence identifier is a unique identifier within the system 1 which identifies the evidence data file 5, for instance in the form of an alpha numeric code. The hash code is computed from the evidence data file by processing the evidence data file with a hashing algorithm. In some embodiments, the hashing algorithm is selected from a group including, but not limited to, MD5, SHA-1, SHA-2, SHA-224, SHA-256, SHA-384, SHA-512, SHA-512/224, SHA-512/256, SHA-3, SHA3-224, SHA3-256, SHA3-384, SHA3-512, SHAKE128 or SHAKE256.

In some embodiments, the input module 4 or the processor 2 is configured to assign an evidence identifier to the evidence data file 5 and/or to compute a hash code from the evidence data file 5. In other embodiments, the system 1 receives an evidence data file 5 via the input module 4 with the evidence identifier and hash code already associated with the evidence data file 5.

The input module 4 transmits the evidence data file 5 and its associated evidence identifier and hash code to the processor 2.

The processor 2 is configured to communicate with a blockchain system 6. In some embodiments, the blockchain system 6 is integrated as a component or module within the system 1. In other embodiments, the blockchain system 6 is a remote system which is configured to communicate with the system 1 via a network, such as the Internet, with the processor 2. In further embodiments, the blockchain system 6 is a peer-to-peer network of computing devices which are operating as a decentralised, distributed digital ledger system.

In some embodiments, the blockchain system 6 is a public system which permits anyone to access the data in the blockchain. In other embodiments, the blockchain system 6 is a closed blockchain system which is only accessible to authorised users. In further embodiments, the blockchain system 6 is configured such that part of the data in the blockchain is accessible to the public and another part of the data in the blockchain is private and only accessible by authorised users.

The processor 2 is further configured for communication with a client computing system or device 7. In some embodiments, the processor 2 is configured to communicate via a network, such as the Internet, with the client computing device 7.

In some embodiments, the client computing device 7 comprises a screen 8 to display information to a user. The client computing device 7 is a device selected from a group including, but not limited to, a desktop computer, laptop computer or a mobile computing device, such as a tablet or smartphone.

The client computing device 7 may be positioned at the same location as the processor 2 or at a remote location. For instance, in some embodiments, the client computing device 7 is positioned in a courtroom for use by a judge during a trial. The client computing device 7 may equally be positioned at any other location, such as the offices of a law firm or at another location where it is desirable to view evidence which is being managed by the system 1.

A method of managing digital evidence of some embodiments will now be described with reference to FIGS. 2 and 3 of the accompanying drawings.

An item of evidence is input into the system 1 via the input module 4. If the item of evidence is not in electronic form then the item of evidence is first digitised into an evidence data file which is input into the system 1 via the input module 4.

For a new piece of evidence, an original evidence data file is input to the system 1 via the input module 4 which communicates the original evidence data file to the processor 2. The system 1 then processes the original evidence data file and generates a block for a blockchain based on the original evidence data file. In some embodiments, the block is generated by the processor 2. In other embodiments, the block is generated by the blockchain system 6.

The system 1 generates the block for the blockchain by combining data indicative of the evidence identifier which identifies the original evidence data file and the hash code which is computed from the original evidence data file. The blockchain system then stores the generated block as a new block in the blockchain. In this case, the block starts a new chain within the blockchain since it corresponds to an original evidence data file which is being imported into the system 1 for the first time.

The system 1 is configured to store the original evidence data file in the memory 3 in its original form. This enables the original evidence data file to be inspected at a later date.

In some embodiments, the system 1 does not store any part of the evidence data file in the blockchain. The block which is stored in the blockchain represents the evidence identifier and the hash code computed from the original evidence data file and the content of the original evidence data file is not derivable from this information.

The system 1 is further configured to perform at least one transformation operation on an evidence data file 5 when the evidence data file 5 is input into the system 1. In some embodiments, the transformation operation is dependent on the format of the evidence data file 5. For instance, in some embodiments, the system 1 is configured to determine if the evidence data file 5 is a PDF file and, if the evidence data file is not a PDF file, the system 1 is configured to perform a transformation operation to convert the evidence data file into a PDF file.

In some embodiments, the system 1 is configured to collate a plurality of evidence data files into a composite PDF file by performing one or more transformation operations to combine the plurality of evidence data files into one or more composite PDF files. This operation constitutes a further transformation operation which occurs within the system 1.

In some embodiments, the system 1 is configured to perform a transformation operation to paginate a composite PDF file by inserting page numbers onto the pages of the composite PDF file.

In some embodiments, the system 1 is configured to perform a transformation operation to generate an image file, such as a rasterised image file, from one or more pages of an evidence data file. In some embodiments, the system 1 generates both a low resolution image file and a higher resolution image file for each page of an evidence data file. The system 1 stores the high and low resolution image files in the memory 3.

In some embodiments, the system is configured to perform optical character recognition (OCR) on a document when the document is input to the system 1.

Figure 2:
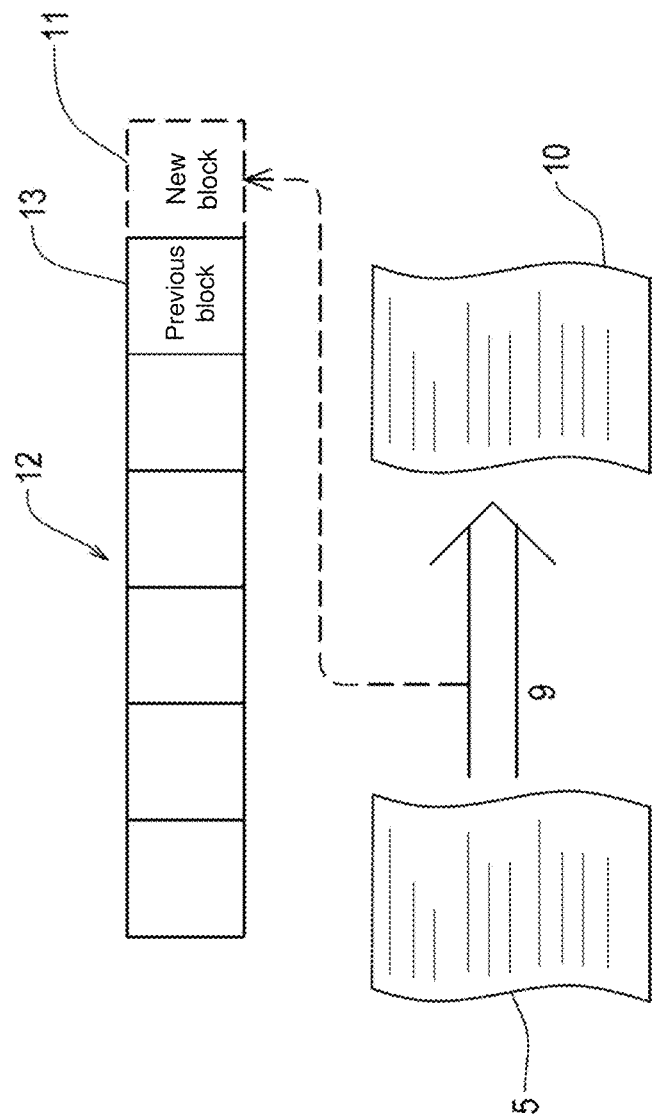
FIG. 2 is a schematic diagram showing the operation of some embodiments with a blockchain.
Figure 3:
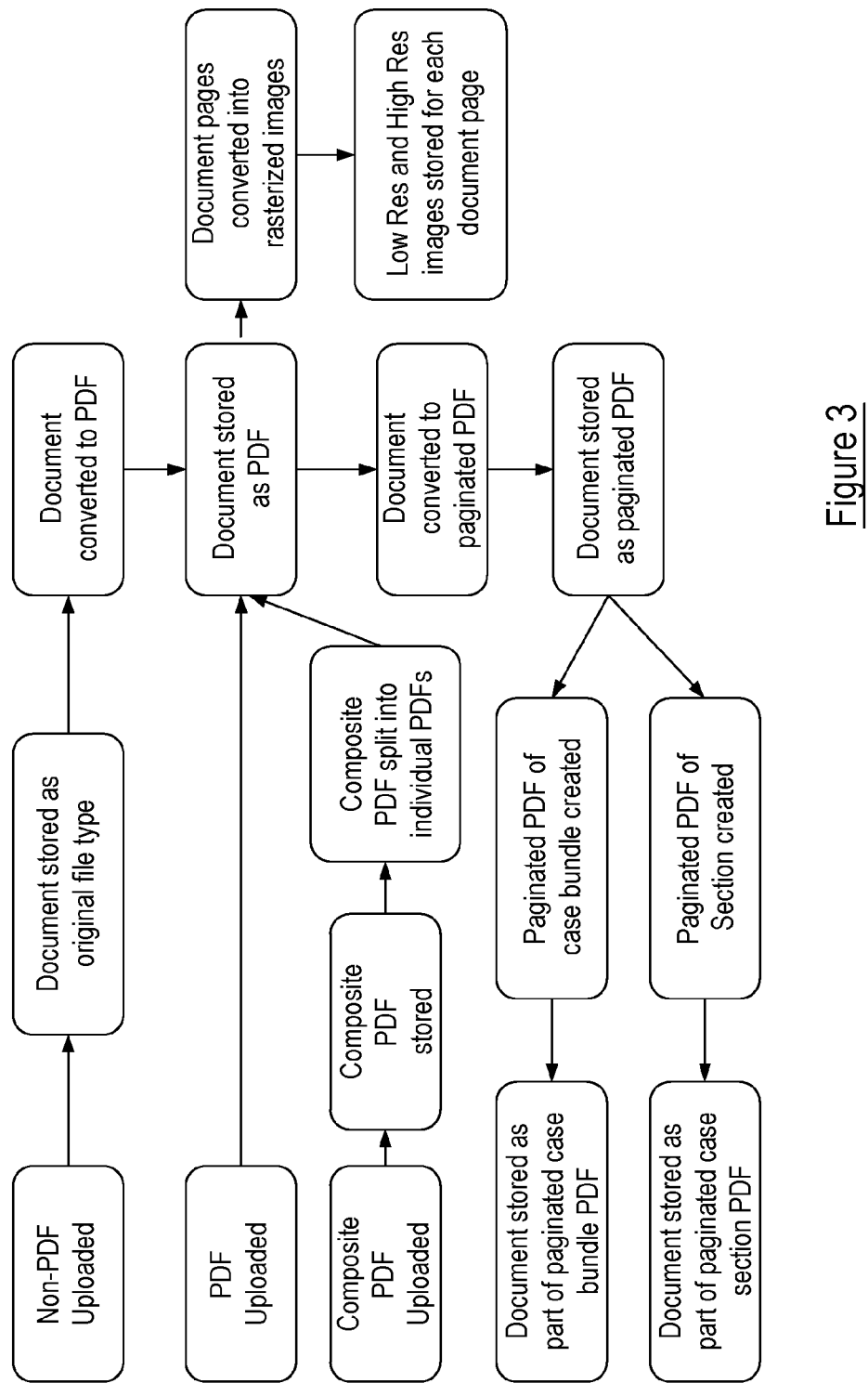
FIG. 3 is an example flow diagram indicative of the operation of a method of some embodiments.

Referring now to FIG. 2 of the accompanying drawings, when the system 1 performs a transformation operation 9 on an evidence data file 5, the system 1 generates a transformed evidence data file 10. When the system 1 performs the transformation operation 9, the system 1 generates a new block 11 in a blockchain 12. The system 1 generates the new block 11 by combining at least some and preferably all of the following data:

Data indicative of a hash of a previous block 13 in the blockchain 12,
the evidence identifier of the transformed evidence data file 10,
a hash code computed from the transformed evidence data file 10,
data indicative of the transformation operation 9, and
a timestamp indicating the time at which the transformation operation 9 was performed.

In further embodiments, the system 1 also combines data indicative of the person or entity that performed or requested the transformation operation 9 into the block 11 which is stored in the blockchain 12.

The system 1 is configured to receive a plurality of evidence data files and to perform transformation operations on each evidence data file and to store the evidence data files and the transformed evidence data files in the memory 3. Each evidence data file and transformation operation is logged in the blockchain 12 so that the blockchain 12 provides an irrefutable record of the evidence data files which are being managed by the system 1 and all transformation operations performed on the evidence data files within the system 1.

Each transaction or block on the blockchain 12 will identify at least one and preferably all of the following:
1. The evidence identifier and the hash code of an evidence data file.
2. The evidence identifier and the hash code of the transformed evidence data file.
3. Data indicative of the transformation operation applied to the evidence data file to produce the transformed evidence data file.
4. Data indicative of the identity of the person or entity which performed or instructed the transformation operation.
5. A timestamp indicating when the transformation operation was performed.
6. Security information including, but not limited to, the IP address of the requester, the MAC code of the requester, instance identifier and location of the processor if the evidence data file is processed at a location which is remote from the system 1.

The data in the blockchain 12 provides an irrefutable chain of proof which can be consulted to determine what transformation operations have been performed on an evidence data file and to verify the authenticity of a transformed evidence data file.

If a user knows the evidence identifier and/or a hash code computed from an evidence data file, the user can search the blockchain 12 for the evidence identifier and/or the hash code. If the blockchain 12 includes a block with the identifier and the hash code then data in the blockchain confirms for certain that the evidence data file corresponds to an evidence data file which has been processed by the system 1 and that the evidence data file can be traced back to an original evidence data file that was input into the system 1. The user can therefore trust the evidence data file as being authentic since any tampering to the evidence data file would change the hash code of the evidence data file such that the hash code no longer matches a hash code in the blockchain 12.

Once the system 1 has received evidence data files, the system 1 can be used to display the evidence data files to a user via the client computing device 7. A user requests an item of evidence via the client computing device 7 which transmits a request to the processor 2. The processor 2 identifies the item of evidence based on the evidence identifier and transmits the evidence data file or a transformed evidence data file corresponding to the item of evidence to the client computing device 7. The client computing device 7 is configured to display the evidence on the screen 8.

The system 1 is configured such that when the system 1 receives a request from a user, the system 1 outputs at least part of the data in the blockchain 12 to enable the user to verify the authenticity of an evidence data file using the data in the blockchain.

In some embodiments, the system 1 is configured to display an authenticity indicator to a user on the display screen 8 simultaneously with an image of the requested evidence. In some embodiments, the system 1 is configured to transmit a low resolution image file to the client computing device 7 to minimise the data which must be transferred to the client computing device 7, and hence increase the speed at which a user can browse through pages of evidence. In some embodiments, the system 1 is configured to transmit the higher resolution image to the client computing device 7 in response to a user request so that the user can view the evidence data file at a higher resolution.

The authenticity indicator provides a confirmation to the user that the evidence displayed on the display screen 8 is authentic since the evidence is verified as being authentic by the data in the blockchain 12.

In some embodiments, the system is configured to allow the data behind the authenticity indicator to be obtained through a public Application Programming Interface (API) so that the data displayed on the display screen 8 can be confirmed to have been generated directly from the contents of a block on the blockchain 12. This allows a user to verify that the authenticity indicator displayed on the display screen 8 is truly reflective of the data on the blockchain and hence that no tampering has occurred prior to displaying the authenticity indicator on the display screen 8.

In some embodiments, the system 1 is configured to provide a copy of the blockchain 12 to another host system, such as a computer system that is managed by a justice ministry in a country. In these embodiments, the system is configured with an API which enables a user to access the data in the copy of the blockchain 12 directly. This enables a user to confirm that the data behind the authenticity indicator displayed on the display screen 8 is based on data on the blockchain 12.

The system 1 of some embodiments provides an efficient end-to-end system for managing evidence which enables a judge viewing evidence via the screen 8 of the client computing device 7 to fully trust that the evidence is authentic since any and all transformations to the evidence are logged in the blockchain.

Embodiments of the subject matter and the functional operations described herein can be implemented in digital electronic circuitry, or in computer software, firmware, or hardware, including the structures disclosed in this specification and their structural equivalents, or in combinations of one or more of them.

Some embodiments are implemented using one or more modules of computer program instructions encoded on a computer-readable medium for execution by, or to control the operation of, a data processing apparatus. The computer-readable medium can be a manufactured product, such as hard drive in a computer system or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The terms "computing device" and "data processing apparatus" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks.

To provide for interaction with a user, some embodiments are implemented on a computer or a mobile device having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A mobile device can be any type of portable electronic device, including a cellular telephone, a Personal Digital Assistant (PDA), smartphone, tablet etc. The mobile device can comprise a display, a Global Positioning System (GPS) module, a Global Navigation Satellite System (GLONASS) module, a compass, one or more cameras and various other input/output (I/O) components.

When used in this specification and the claims, the term "comprises" and "comprising" and variations thereof mean that specified features, steps or integers and included. The terms are not to be interpreted to exclude the presence of other features, steps or compounds.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realising the invention in diverse forms thereof.

It is claimed:

1. A computer-implemented method for managing digital evidence using a blockchain, the method comprising:
   receiving an evidence data file, the evidence data file being identified by:
      an evidence identifier, and
      a hash code computed from the evidence data file;
   performing a transformation operation of the evidence data file to produce a transformed evidence data file, wherein the transformation operation comprises:
      determining if the evidence data file is a Portable Document Format (PDF) file and, if the evidence data file is not a PDF file, performing a transformation operation to convert the evidence data file into a PDF file;
      collating the evidence data file with at least one further evidence data file to create a composite PDF file; and paginating the composite PDF file by inserting page numbers onto the pages of the composite PDF file, wherein the composite PDF file is the transformed evidence data file;
generating a block for the blockchain by combining data indicative of:
a hash of a previous block in the blockchain,
the evidence identifier,
a hash code computed from the transformed evidence data file,
the transformation operation, and
a timestamp indicating the time at which the transformation operation was performed;
storing the generated block as a new block in the blockchain;
performing an image transformation operation on at least part of the evidence data file to generate a transformed evidence data file in the form of an image file which, when decoded and viewed on a display screen, represents the appearance of at least part of the evidence data file;
outputting an authenticity indicator simultaneously with an image of a requested transformed evidence data file in response to a user request to enable a user to verify the authenticity of the transformed evidence data file using the data in the blockchain;
decoding and displaying each image file in response to a request from the user;
displaying an authenticity indicator to a user with each image file, the authenticity indicator being indicative of data in the blockchain to notify a user viewing the authenticity indicator that the image file is verified as authentic by the data in the blockchain.

2. The method of claim 1, wherein the method further comprises:
assigning the evidence identifier to the evidence data file; and
computing the hash code from the evidence data file.

3. The method of claim 1, wherein the method further comprises:
performing a plurality of transformation operations on the evidence data file to produce the transformed evidence data file.

4. The method of claim 1, wherein the method further comprises generating a first image file and a second image file, wherein the image resolution of the first image file is lower than the image resolution of the second image file.

5. The method of claim 1, wherein the method further comprises:
storing the evidence data file and each transformed evidence data file in a secure memory, the secure memory being configured to minimise or prevent an unauthorised user from accessing the evidence data file and each transformed evidence data file.

6. The method of claim 1, wherein the method further comprises receiving a plurality of evidence data files and repeating the steps of the method for each of the plurality of evidence data files.

7. A system comprising:
a processor; and
a memory storing instructions which, when executed by the processor, cause the system to perform actions including:
receiving an evidence data file, the evidence data file being identified by:
an evidence identifier, and
a hash code computed from the evidence data file;
performing a transformation operation of the evidence data file to produce a transformed evidence data file, wherein the transformation operation comprises:
determining if the evidence data file is a Portable Document Format (PDF) and, if the evidence data file is not a PDF file, performing a transformation operation to convert the evidence data file into a PDF file;
collating the evidence data file with at least one further evidence data file to create a composite PDF file; and
paginating the composite PDF file by inserting page numbers onto the pages of the composite PDF file, wherein the composite PDF file is the transformed evidence data file;
generating a block for the blockchain by combining data indicative of:
a hash of a previous block in the blockchain,
the evidence identifier,
a hash code computed from the transformed evidence data file,
the transformation operation, and
a timestamp indicating the time at which the transformation operation was performed;
storing the generated block as a new block in the blockchain;
performing an image transformation operation on at least part of the evidence data file to generate a transformed evidence data file in the form of an image file which, when decoded and viewed on a display screen, represents the appearance of at least part of the evidence data file;
outputting an authenticity indicator simultaneously with an image of a requested transformed evidence data file in response to a user request to enable a user to verify the authenticity of the transformed evidence data file using the data in the blockchain;
decoding and displaying each image file in response to a request from the user;
displaying an authenticity indicator to a user with each image file, the authenticity indicator being indicative of data in the blockchain to notify a user viewing the authenticity indicator that the image file is verified as authentic by the data in the blockchain.

8. The system of claim 7, wherein the memory stores further instructions which, when executed by the processor, cause the system to perform further actions including:
assigning the evidence identifier to the evidence data file; and
computing the hash code from the evidence data file.

9. The system of claim 7, wherein the memory stores further instructions which, when executed by the processor, cause the system to perform further actions including:
performing a plurality of transformation operations on the evidence data file to produce the transformed evidence data file.

10. A non-transitory computer-readable medium having instructions stored thereon which when executed by a processor included in a system cause the system to perform operations including:
receiving an evidence data file, the evidence data file being identified by:
an evidence identifier, and
a hash code computed from the evidence data file;
performing a transformation operation of the evidence data file to produce a transformed evidence data file, wherein the transformation operation comprises:

determining if the evidence data file is a Portable Document Format (PDF) and, if the evidence data file is not a PDF file, performing a transformation operation to convert the evidence data file into a PDF file;
collating the evidence data file with at least one further evidence data file to create a composite PDF file; and
paginating the composite PDF file by inserting page numbers onto the pages of the composite PDF file, wherein the composite PDF file is the transformed evidence data file;
generating a block for the blockchain by combining data indicative of:
a hash of a previous block in the blockchain,
the evidence identifier,
a hash code computed from the transformed evidence data file,
the transformation operation, and
a timestamp indicating the time at which the transformation operation was performed;
storing the generated block as a new block in the blockchain;
performing an image transformation operation on at least part of the evidence data file to generate a transformed evidence data file in the form of an image file which, when decoded and viewed on a display screen, represents the appearance of at least part of the evidence data file;
outputting an authenticity indicator simultaneously with an image of a requested transformed evidence data file in response to a user request to enable a user to verify the authenticity of the transformed evidence data file using the data in the blockchain;
decoding and displaying each image file in response to a request from the user;
displaying an authenticity indicator to a user with each image file, the authenticity indicator being indicative of data in the blockchain to notify a user viewing the authenticity indicator that the image file is verified as authentic by the data in the blockchain.

11. The non-transitory computer-readable medium of claim 10 having further instructions stored thereon which when executed by a processor included in a system cause the system to perform further operations including:
assigning the evidence identifier to the evidence data file; and
computing the hash code from the evidence data file.

12. The non-transitory computer-readable medium of claim 10 having further instructions stored thereon which when executed by a processor included in a system cause the system to perform further operations including:
performing a plurality of transformation operations on the evidence data file to produce the transformed evidence data file.

\* \* \* \* \*